US010924960B2

(12) United States Patent
Sundaram

(10) Patent No.: US 10,924,960 B2
(45) Date of Patent: Feb. 16, 2021

(54) SYSTEMS AND METHODS FOR PROVIDING MOBILITY ASPECTS TO APPLICATIONS IN THE CLOUD

(71) Applicant: Alef Mobitech Inc., Bernardsville, NJ (US)

(72) Inventor: Ganapathy Subramanian Sundaram, Hillsborough, NJ (US)

(73) Assignee: Alef Mobitech Inc., Bernardsville, NJ (US)

( * ) Notice: Subject to any disclaimer, the term of this patent is extended or adjusted under 35 U.S.C. 154(b) by 0 days.

(21) Appl. No.: 16/942,204

(22) Filed: Jul. 29, 2020

(65) Prior Publication Data
US 2020/0359252 A1 Nov. 12, 2020

Related U.S. Application Data

(63) Continuation of application No. 16/835,811, filed on Mar. 31, 2020, which is a continuation of application
(Continued)

(51) Int. Cl.
*H04L 29/08* (2006.01)
*H04W 28/02* (2009.01)
(Continued)

(52) U.S. Cl.
CPC ..... *H04W 28/0226* (2013.01); *H04L 41/5054* (2013.01); *H04L 67/141* (2013.01);
(Continued)

(58) Field of Classification Search
CPC . H04L 41/0695; H04L 67/288; H04L 67/289; H04L 67/34; H04L 67/10;
(Continued)

(56) References Cited

U.S. PATENT DOCUMENTS 7,149,797 B1   12/2006  Weller et al.
9,635,580 B2    4/2017  Sundaram
                (Continued)

FOREIGN PATENT DOCUMENTS

WO       01/76192 A2    10/2001
WO    2013/049603 A1    4/2013

OTHER PUBLICATIONS

Stella Spagna et al., "Design Principles of an Operator-Owned Highly Distributed Content Delivery Network," IEEE Communications Magazine, IEE Service Center, Piscataway, US, vol. 51, No. 4, Apr. 1, 2013, pp. 132-140.
(Continued)

*Primary Examiner* — Jungwon Chang
(74) *Attorney, Agent, or Firm* — DLA Piper LLP (US)

(57) ABSTRACT

An exemplary system according to the present disclosure comprises at least one mobility networking module implemented in at least one lower tier radiolet. The mobility network module performs one or more traffic data plane functions. The exemplary system further comprises at least one mobility application module implemented in at least one upper tier radiolet. The mobility application module performs one or more application data plane functions. The exemplary system further comprises at least one mobility cloud module implemented in the at least one lower tier radiolet and the at least one upper tier radiolet. The mobility cloud module performs computing execution functions of a cloud session.

29 Claims, 6 Drawing Sheets

Related U.S. Application Data

No. 15/461,583, filed on Mar. 17, 2017, now Pat. No. 10,616,788, which is a continuation of application No. 15/164,447, filed on May 25, 2016, now Pat. No. 9,635,580, which is a continuation-in-part of application No. 14/711,865, filed on May 14, 2015, now abandoned, which is a continuation of application No. 14/508,073, filed on Oct. 7, 2014, now Pat. No. 9,037,646.

(60) Provisional application No. 61/888,280, filed on Oct. 8, 2013.

(51) Int. Cl.
*H04W 8/02* (2009.01)
*H04W 4/60* (2018.01)
*H04L 12/24* (2006.01)

(52) U.S. Cl.
CPC ........ *H04L 67/2804* (2013.01); *H04L 67/288* (2013.01); *H04L 67/289* (2013.01); *H04L 67/2842* (2013.01); *H04L 67/2885* (2013.01); *H04L 67/34* (2013.01); *H04W 4/60* (2018.02); *H04W 8/02* (2013.01)

(58) Field of Classification Search
CPC ... H04L 67/04; H04L 67/141; H04L 67/2804; H04L 67/2842; H04L 67/2885; H04L 41/5054; H04W 28/0226; H04W 4/60; H04W 8/02
See application file for complete search history.

(56) References Cited

U.S. PATENT DOCUMENTS

| | | |
|---|---|---|
| 2002/0004846 A1 | 1/2002 | Garcia-Luna-Aceves et al. |
| 2002/0114278 A1 | 8/2002 | Coussement |
| 2004/0205219 A1 | 10/2004 | Li et al. |
| 2010/0034200 A1 | 2/2010 | MeLampy et al. |
| 2011/0137888 A1 | 6/2011 | Yoo et al. |
| 2012/0028638 A1 | 2/2012 | Mueck et al. |
| 2012/0044908 A1 | 2/2012 | Spinelli et al. |
| 2012/0089700 A1 | 4/2012 | Safruti et al. |
| 2012/0170581 A1 | 7/2012 | Li |
| 2012/0224694 A1 | 9/2012 | Lu et al. |
| 2012/0303835 A1* | 11/2012 | Kempf ............ H04L 41/0695 709/235 |
| 2013/0044705 A1* | 2/2013 | Akhtar ............ H04W 48/18 370/329 |
| 2013/0283364 A1 | 10/2013 | Chang et al. |
| 2013/0297769 A1 | 11/2013 | Chang et al. |
| 2013/0308559 A1 | 11/2013 | Bosch et al. |
| 2013/0336286 A1 | 12/2013 | Anschutz |
| 2014/0073289 A1 | 3/2014 | Velasco |
| 2014/0079049 A1 | 3/2014 | Friman et al. |
| 2014/0086177 A1* | 3/2014 | Adjakple ............ H04L 67/10 370/329 |
| 2014/0108665 A1 | 4/2014 | Arora et al. |
| 2014/0280961 A1 | 9/2014 | Martinez et al. |
| 2014/0301203 A1 | 10/2014 | Kampmann et al. |
| 2014/0369229 A1 | 12/2014 | Martineau |
| 2014/0373092 A1 | 12/2014 | Hussain et al. |
| 2015/0032846 A1* | 1/2015 | Doken ............ H04W 4/60 709/217 |
| 2015/0058966 A1 | 2/2015 | Pourzandi et al. |
| 2015/0071165 A1* | 3/2015 | Joachimpillai ..... H04L 43/0817 370/328 |
| 2015/0088586 A1 | 3/2015 | Pavlas et al. |
| 2015/0092576 A1 | 4/2015 | Vaidya et al. |
| 2015/0195372 A1* | 7/2015 | Zheng ............ H04L 67/04 709/217 |
| 2015/0244797 A1* | 8/2015 | Edwall ............ H04L 67/10 709/201 |
| 2016/0020946 A1 | 1/2016 | Morper |
| 2016/0094351 A1 | 3/2016 | Rune et al. |
| 2016/0112847 A1 | 4/2016 | Hyytiainen |

OTHER PUBLICATIONS

The International Search Report and the International Written Opinion dated Jan. 9, 2015 for corresponding International Application No. PCT/US14/59605.

The European Search Report dated Feb. 17, 2015 for corresponding European Application No. 14188155.7.

* cited by examiner

SYSTEMS AND METHODS FOR PROVIDING MOBILITY ASPECTS TO APPLICATIONS IN THE CLOUD

TECHNICAL FIELD

The present disclosure relates generally to mobile cloud computing and providing application mobility and mobility to the cloud, and more particularly to enhancing mobile cloud based applications delivered over mobile broadband networks. The present disclosure also related to enabling mobile apps to work in tandem with mobility networks, and to providing mobility aspects to applications in the cloud.

BACKGROUND

Mobile Internet is a technology which is predicted to far surpass its fixed Internet counterpart. Fundamentally, the Mobile Internet has become a large, if not the largest, global platform for advertising, collaboration, commerce, communications, entertainment, infotainment, productivity, social networking, etc., on the go. A number of problems and challenges exist in the mobile Internet dimension, including for example (without limitation) the following. There is a lack of sustained engagement; given the smart-device revolution, there is an app for "everything" and designing the next successful app is highly desirable. Furthermore, subscriber expectations for a desktop internet experience over the mobile Internet is dramatically impacting engagement. There are high costs and low revenue; both IT costs, and customer related acquisition and retention costs are increasing in a competitive app provider market place. Multi-media features are par for the course, yet the return on investment of rolling out premium features is very low. Traffic volumes corresponding to rich-media features are exponentially higher compared to text-based features of yesteryears but corresponding improvements in revenue are incremental.

Also, there is a lack of revenue generating services; from a mobile network operator perspective, what used to be a multi-services offering (with voice, messaging and premium messaging services, data applications like blackberry email, etc.) has dwindled down rapidly to a data bandwidth service, with the only differentiation in the market being pricing. However, given the explosion in the number of over-the-top applications that are media rich (and bandwidth hogs), traffic growth has been significant requiring operators to make substantial investments. Simultaneously, given the near absence of differentiation, customer acquisition costs have sky rocketed (for instance, in developed nations and markets, subscriber acquisition costs are tied to device subsidies which have skyrocketed). Despite all these investments and subsidies, networks continue to be choked leading to poor customer engagement.

While access to the Internet through mobile broadband systems has expanded significantly, and application choices have grown exponentially, rich immersive and interactive solutions have not been achieved, leading to low engagement, high churn, and lost revenue. Complexities in app flow are at the heart of the problem, and can be categorized in to a sequence of chained problems (that are unique to mobility networks), comprising: distributed first mile problem, Mobile Middle Mile™ problem, and wireless last mile problem. In essence, the "cloud lacks mobility" leading to mobile networks treating applications as a sequence of packets and conversely applications treating mobile networks as black boxes.

The fundamental end-to-end complexities noted above can lead to the network and application not working in tandem. Application providers design and architect their delivery solutions by treating the network as a "black box" while network providers treat applications as a sequence of packets. A joint solution is missing from the market today.

In connection with the foregoing, systems and methods are needed for providing application mobility that can create new revenue streams through differentiated offerings, while simultaneously reducing costs, and improving customer engagement. Also, systems and methods are needed that can simplify the first mile, eliminate the Mobile Middle Mile™, and unclog the wireless last mile.

SUMMARY

The present disclosure relates to systems and methods of providing mobility to the cloud comprising at least one mobility networking module implemented in at least one lower tier radiolet and comprising at least one processor executing computer readable instructions that cause the at least one mobility network module to perform one or more traffic data plane functions. The present disclosure further comprises at least one mobility application module implemented in at least one upper tier radiolet and comprising at least one processor executing computer readable instructions that cause the at least one mobility network module to perform one or more application data plane functions. The present disclosure further comprises at least one mobility cloud module implemented in the at least one lower tier radiolet and the at least one upper tier radiolet and comprising at least one processor executing computer readable instructions that cause the at least one mobility cloud module to perform computing execution functions of a cloud session.

BRIEF DESCRIPTION OF DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings.

DETAILED DESCRIPTION

Figure 1:
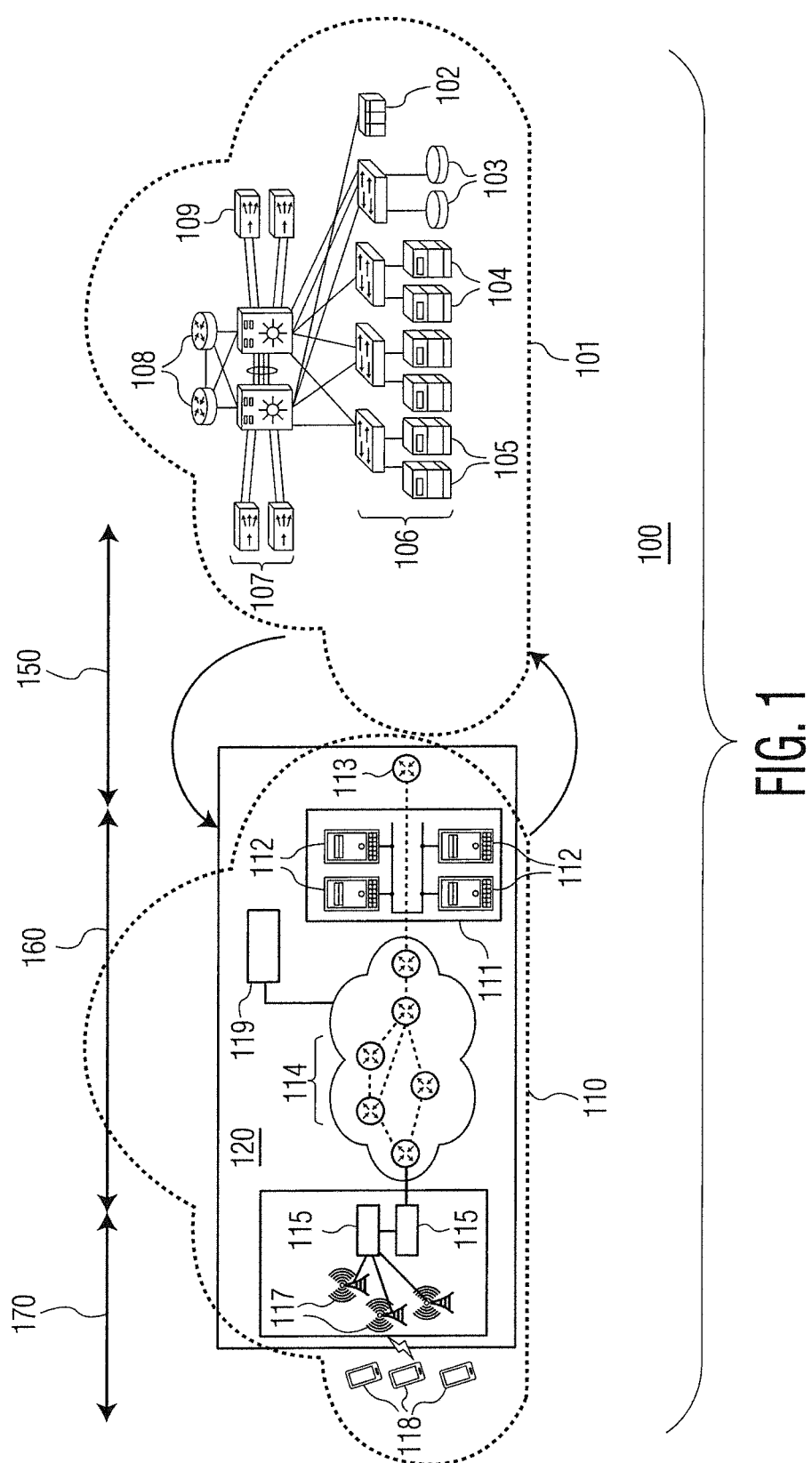
FIG. 1 illustrates an exemplary end-to-end application flow of a mobile device accessing an application in a datacenter through a mobile communications network.

The following definitions and descriptions are provided and may be useful to better understand the concepts described in this disclosure:

"Radiolet™" refers to any type of server or servers, including those configured for use in connection with mobile data networks such as, for example, any application servers, communications servers, proxy servers or any other suitably configured servers. The server or servers may comprise any type of computer software and computer hardware, and include one or more processors for executing computer-readable instructions. In an exemplary embodiment, a Radiolet™ may refer to a temporary and partial instance of a cloud (e.g., the Internet), embodied and provide via one or more servers located at a radio edge (e.g., outer limits of radio processing functions within a mobile data network), that is configured to be application aware and to provide one or more application services.

"computer" or "computer hardware" refers to any electronic device or devices, including those capable of being utilized in connection with a mobile data system, such as, for example, any device capable of receiving, transmitting, processing and/or using data and information. A computer or computer hardware may comprise one or more of the following: a server, a processor, a microprocessor, a personal computer such as, for example, a laptop computer, a tablet, a palm PC, a desktop or a workstation computer, a network server, a mainframe, an electronic wired or wireless device such as, for example, a telephone, a cellular telephone, a personal digital assistant or a smart phone, an interactive television such as, for example, a television adapted to be connected to the Internet or an electronic device adapted for use with a television, an electronic pager or any other computing and/or communication device, whether located in a single or across multiple locations.

"network" refers to any type of network or networks, including those capable of being utilized in connection with a mobile data system such as, for example, any public and/or private networks, including, for instance, the Internet, an intranet, an extranet, or any wired or wireless network(s) or combinations thereof.

"data" refers to any type of facts, figures, statistics, details, images, multi-media content, quantities, characters, symbols or any other type of information and/or communication, including those capable of being utilized in connection with a mobile data network such as, for example, any Internet content data or Internet application data, that may be received, processed, stored and/or transmitted by a computer in the form of electrical signals and recorded on magnetic, optical, and/or mechanical recording media.

"datacenter" refers to one or more networked computer servers configured for receiving, processing, storing and distributing large amounts of data. For purposes of the present disclosure, datacenters may also be configured to operate within mobile data networks such as, for example, an Internet cloud-based datacenter.

"application" refers to a collection of one or more computer-readable instructions that when executed, carry out one or more specific operations. In the context of the present disclosure, an application may be embodied as software executing on one or more computers and configured to perform operations for use in connection with mobile data networks, although the present disclosure is not limited thereto. For purposes of the present disclosure, an application may be configured for use in conjunction with any operating system platform, such as, for example (and without limitation), Windows®, Android®, and Apple®.

Applications (or "apps") are the "secret sauce" of the mobile Internet and often serve as springs of creativity for providers to engage in an immersive, intelligent, and interactive digital dialog. Often creativity leads to complexity, and apps have come a long way from their desktop browser based application counterparts. Features of an exemplary mobile commerce application comprise (without limitation): search that is contextual, federated, and location based; catalogs that are personalized with related products, and with videos instead of images; payments with support for multiple options and $3^{rd}$ party billing; cart management with interactivity, intelligent order management, and promotions; reviews that are contextual, with do-it-yourself videos, input from social networks, with customer uploads; and customer service chat, feedback, calling, and social media features. Hyper competitive mobile commerce markets aim to design apps that achieve the following goal: to make the buying experience more delightful, accessible, aspirational, gratifying and meaningful. In doing so, mobile commerce entities can maintain pricing power and even charge a premium, instead of usual marketing barrage of constant discounts, promotions, and margins squeezing offers. The features above are not limited to mobile commerce apps. For example, mobile apps may have more features and conversely may not include all of the above-illustrated features.

In one embodiment, the present disclosure solves the problems described above through an adaptive overlay architecture that does not require any upgrades to mobile networks or app datacenters. In addition to a technology platform, the present disclosure comprises full-stack solutions that are custom designed to address the above problems with a view towards, dramatically improving the responsiveness, relevance, and richness of the mobile Internet by introducing mobility principles in to the cloud that allows the network and applications to work in tandem. From a subscriber perspective, this leads to a more immersive, intelligent, and interactive mobile Internet.

Complexities in the end-to-end app flow cannot be resolved by staying entirely outside the mobile operator network. Conversely, a purely operator centric solution, to an app provider problem will not work without an engagement with app providers. In particular, responsive, rich media, and relevant apps are the domain of app providers. Given the maturity of mobile networks and app datacenters, a solution that requires a forklift of either the network or an app datacenter is not a viable market option. Hence, the present disclosure can create an overlay solution that does not require any upgrades to either mobile networks or the app datacenters.

The present disclosure provides solutions that work across the board to create an immersive, intelligent, and interactive engagements, regardless of access network type or application type and can gain wider applicability.

Turning now to FIG. 1, FIG. 1 illustrates an exemplary end-to-end application flow of a mobile device accessing an application in a datacenter through a mobile communications network 100. Application cloud/datacenter 101 treats the mobile network 110 as a black-box, and mobile network 110 treats the application cloud/datacenter 101 as a sequence of bytes. The "complex" first mile 150 comprises the application cloud/datacenter 101. The application cloud/datacenter 101 can comprise a distribution layer 107, comprising an enterprise campus core 108 and application delivery appliances 109, and a layer 2 or 3 access layer 106, comprising web and front end servers 105, application servers 104, databases 103 and mainframes 102. The distribution layer 107 and the layer 2 or 3 access layer 106 can communicate via one or more networks. The "long" middle mile 160 can comprise the mobile network 110. The mobile network 110 can comprise a gateway GPRS support node (GGSN) server 113, a public land mobile network (PLMN) 120 comprising a service network 111 comprising servers 112, a core network 114, a public switched telephone network/integrated services digital network (PSTN/ISDN) 119, a radio access network (RAN) comprising radio network controllers (RNC) 115, and cell stations 117. The service network 111, the core network 114, and the RAN can communicate via one or more networks. The "clogged" last mile 170 can comprise the wireless link between a cell station 117 and various mobile stations 118.

Figure 2:
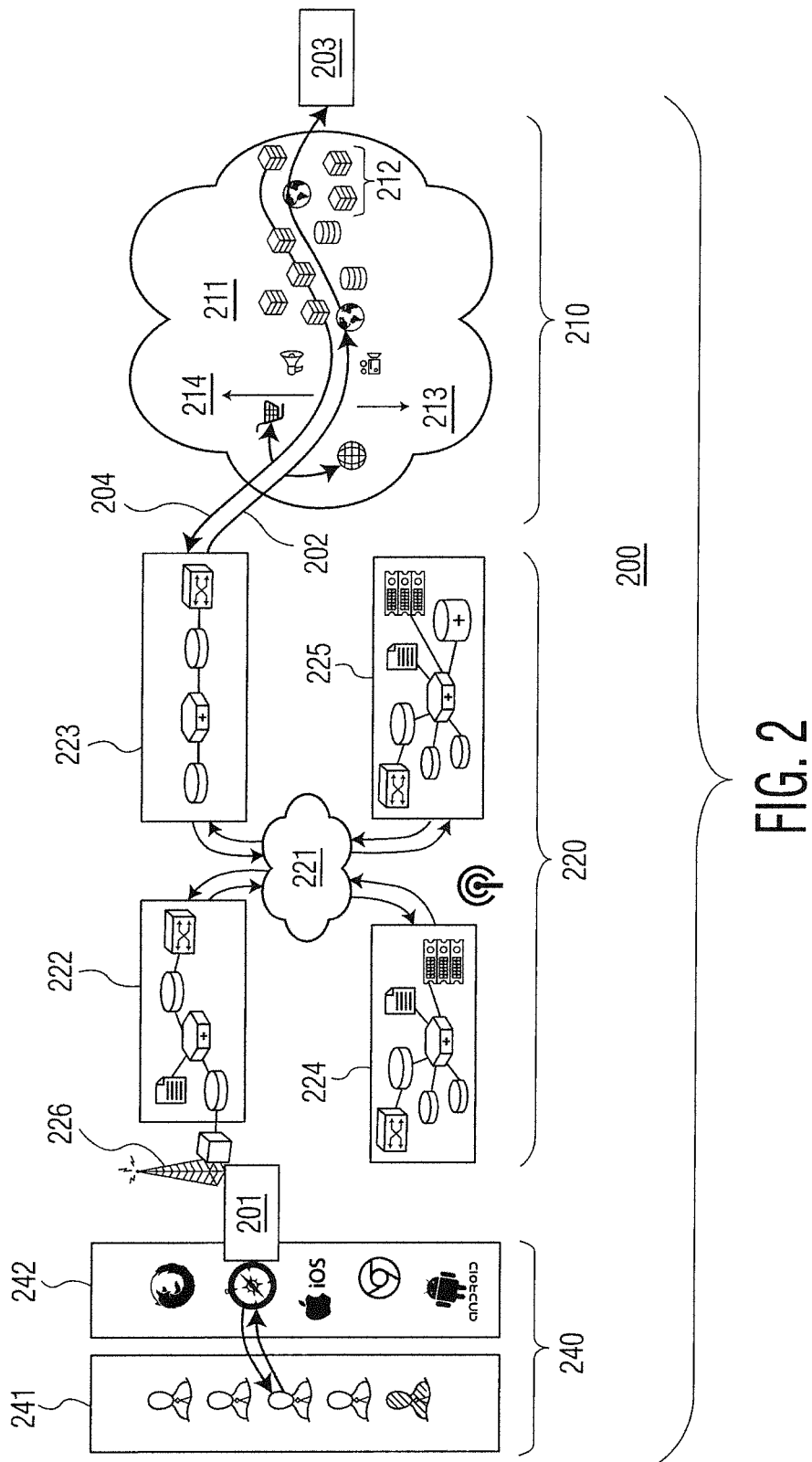
FIG. 2 illustrates mobile request and response pathways through an exemplary mobile communications network.

Turning now to FIG. 2, FIG. 2 illustrates mobile request and response pathways through an exemplary mobile communications network 200. The "complex" first mile 210 comprises an application cloud 211 comprising infrastructure 212 (for example as described above in FIG. 1), third party legacy front end applications 214 and third party datacenters 213. The "long" middle mile 220 comprises a central switching site 225, a regional switching site 224, an Internet point of presence (POP) 223, a local switching site 222, and an external transport network 221. The "clogged" last mile 240 comprises base station 201, devices (e.g., browsers) 242, and customers 241.

A request 201 travels via request pathway 202 from the "clogged" last mile 240 through the mobility network 220 via local switching site 222, regional switching site 224, central switching site 225, and Internet POP 223, and through the "complex" first mile 210 to infrastructure 212. A response 203 travels via response pathway 204 from infrastructure 212 through the "complex" first mile 210, through the mobility network 220 via Internet POP 223, central switching site 225, regional switching site 224, and local switching site 222, and through the "clogged" last mile 240 to the customer 241.

As illustrated for example in FIGS. 1 and 2, the end-to-end flow comprises a combination of mobile carrier networks, cloud front-end systems, as well as a complex web of back-end infrastructure comprising multiple virtual instances of application servers, databases, web servers, and $3^{rd}$ party servers. Distributed applications can be broken down into tens or hundreds of components that are each owned, operated and potentially managed by different entities. Virtualization adds another layer of complexity which is layered on top of the distributed applications. Datacenters often comprise multiple racks of servers, with a complex grove of hypervisors executing different pieces of application logic and accessing storage across multiple networks and locations.

The path above the mobile carrier network (e.g., 110 in FIG. 1 and 220 in FIG. 2) is often referred to as the "distributed first mile." The complexities in the distributed first mile can comprise inefficiency and lack of responsive from the end-user perspective. Also, it can be a source of unpredictability in end-user experience from an application provider perspective. The mobile carrier network (described in more detail below) can be a significant source of unpredictability.

Of particular interest, in the end-to-end flow described above, is the traversal of packets through the mobile network. Mobile networks have been built as access network to the Internet and in particular the central design principle of these networks is to enable "mobility" (e.g., handovers or handoffs) between various network elements as the user migrates. A "centralized design" forces "choke points" in the network. Subsequently, after the design and standardization of these networks, operator deployments can be optimized for "cost per bit" from an operating expense perspective rather than from a user experience perspective. This combined reality, has led to what is known as the "Mobile Middle Mile™" problem, for example as illustrated in FIGS. 1 and 2.

For example, illustrated in FIGS. 1 and 2 is a microcosm of a data packet's traversal through the mobile operator network. Essentially, every packet through the access network goes through a sequence of switching locations that are geographically distributed (and often not connected at the shortest distance but instead with large routed distances). For example, multiple hundreds of cell sites can be aggregated at a local switching site and multiple local switching sites can be aggregated at a regional switching site. Every operator can have a few central switching sites and "peer" with the Internet at very few Internet POPs.

This hierarchical architecture can be significant source of unpredictability and inefficiency. This overall route between the local switching site and the Internet POP is referred to as the Mobile Middle Mile™. This path is unique to mobile networks, and is central to the design and standards across multiple generations of networks. Moreover, these networks can be optimized for packet processing and delivery rather than application awareness and datacenter efficiency. This clash in design philosophy combined with the natural "choke points" in the architecture can lead to high costs and unpredictability in application performance and user responsiveness.

Embedded in a packet's traversal through an operator's wireless network is the wireless last mile (or the first mile from the user's perspective). Fundamentally, the wireless last mile is different from fixed line networks for example (without limitation): 1) the last mile of wireless networks is shared across users/devices, whereas the last mile connectivity is often dedicated in a fixed line network; 2) the last mile spectrum is a precious resource, which often requires licensing and availability when an operator needs it, and is willing to spend, which is often dependent on regulatory constraints regardless of geography; and 3) fixed line networks, especially fiber-based networks, are not as bandwidth challenged as wireless networks. Given these unique constraints, unclogging the wireless last mile is an important aspect of an end-to-end approach to improving user engagement.

For example, as illustrated in FIGS. 1 and 2, the "path" taken by data packets, above the mobile operator network is often referred to as the "complex" first mile. Apps are often considered to be "customized browsers with extra software modules for a specific site," however such an explanation misses the inherent complexities of apps. Apps are like "systems" rather than websites which were "digital destinations." Systems can comprise components that are connected. These components are logically related, and can change each other. For example, a typical app provider has an ecosystem of objects (some of which are third party objects) that can be aggregated in multiple ways (e.g., depending on the user, location, device, etc.), in order to deliver a system of objects that are logically related.

The "first mile" is not a path from a "destination" to a border gateway protocol (BGP) router at a peering location (e.g., where the operator peers), but instead is a complex set of "paths" and "interactions" between components of "systems". The present disclosure can simplify the first mile through a systems approach, by serving as an intermediary component of various systems, can overlay a "system" and distributed network of software instances, and comprises a design with flexibility and can adapt to change.

The path between the local switching office (or local mobile telephone switching office (MTSO)) and the peering location, which is managed by the mobile network operator, is referred to as the Mobile Middle Mile™. This is a collection of locations with each location consisting of a complex set of local area networks (LAN) (with each LAN being decomposed in to multiple virtual LANS (VLANS)). The Mobile Middle Mile™ problem is self-contained within an operator network. While functionality within the Mobile Middle Mile™ cannot be eliminated (certain functions within the Mobile Middle Mile™ are also performed in the distributed first mile; this overlap can be eliminated either in the first mile or middle mile), certain paths can be eliminated in the middle mile for traffic packets. Many of the functions that are performed within the Mobile Middle Mile™ are also performed in the first mile.

Differences between the mobile last mile and fixed network last miles include, for example (without limitation): mobile last mile is shared, but fixed last mile is not; unclogging mobile last mile is applicable regardless of narrowband or broadband systems and the broader the band the greater the bang for the buck. The present disclosure can bring algorithmic improvements to mobile last mile. These algorithms can work in tandem with the rest of the solution infrastructure. In particular, efficacy of mobile last mile algorithms applied at the radio edge can be better than when applied at the packet core. Improving the delivery time for "one app instance for one user" does not slow down anybody else and can improve the system efficiency overall. Connectivity, computing, and curation do not co-exist in the mobile Internet, and as the present disclosure solves the problem comprehensively.

The present disclosure is a first-of-its kind combination of software defined mobility networking, and mobile app delivery framework, with the potential to be delivered as a managed overlay service at the radio-edge. One benefit of this solution can be the enablement of premium over-the-top (OTT) consumer and enterprise applications, delivered with rich experience for mobile users, as bundled services through the operator while simultaneously reducing network and application delivery costs. These solutions can be delivered without any upgrades to the network or application datacenters, resulting in significant reduction in costs while simultaneously improving revenue and reducing churn for the value chain.

Currently, operators and the over-the-top ecosystem are working independent of each other and there is significant friction in the value-chain. This combination of working with mobile network operators as well as OTT application providers creates much needed bridges between islands of providers, thereby creating a win-win-win mobile solutions marketplace and a smarter value-chain. There is high consumer appetite for rich media OTT apps. Therefore, collaborating directly with the OTT ecosystem can improve the mobile network system. In addition to bringing a non-disruptive technology solution to the market, that does not require upgrades to existing appliances in the mobile network or application data center, the present disclosure can eliminate the friction in the value-chain by being a "smart enabler" between the operators and the OTT ecosystems.

Moreover, while mobile networks may not have enough capacity when compared to contemporary fiber based fixed line access networks, significant inefficiencies can result due to the application and network not working in tandem due to the complexities in the application flow. In addition to addressing the economic imperatives discussed above, the present disclosure can achieve, for example (without limitation): unclogging of the shared wireless link, substantial improvements to the operating efficiency of the radio access network as well as the packet core, in an access agnostic fashion (e.g., for all types of 2G, 3G, and 4G wireless data systems); dramatic improvement in application performance (e.g., for any application); and can provide a multitude of market facing enablement solutions to address the economic problems.

The basic architectural elements of the present disclosure comprise the following: 1) a mobility network insertion platform; 2) an app and cloud delivery framework; and 3) an interconnect between the insertion platform and delivery framework that can be local and distributed. The mobility network insertion platform can be agnostic to the access network type, can provide clear separation of control plane from the data plane, and can process just data plane while ensuring control plane packets are handled by the existing network functional elements. The mobility network insertion platform can also provide application programming interfaces (API's) for subscriber/session management, quality of experience (QoE), mobility, security, and telecom big data, for example. The app and cloud delivery framework can be agnostic to application type, and can work across static, dynamic, real-time, and conversational application data. The app and cloud delivery framework can provide clear separation of application control plane from media plane, and can process just media plane while ensuring control plane flows are handled by the existing application functional elements. The app and cloud delivery framework can open software development kits (SDK's) for app providers to adaptively integrate and/or upgrade service execution rules.

In an exemplary embodiment, the present disclosure can include the following two tier distributed architecture: a lower tier network of servers (e.g., lower tier Radiolet(s)™) that interface with an operator network and an upper tier network of servers (e.g., upper tier Radiolet(s)™) that interface with a content and application provider eco-system, including, for example, a publisher, advertising network, or enterprise datacenter, or over the top communications application provider datacenter. One or more of the Radiolet(s)™ may represent a temporary and partial instance of a cloud (e.g., a cloudlet such as the Internet), embodied and provide via one or more servers located at a radio edge (e.g., outer limits of a mobile data network), that provides application aware and application service(s), and that comprises software capsules such as, for example, application programming interfaces (APIs). This type of radiolet instance may be referred to as Radio Edge Cloudlet™. One or more lower tier Radiolet(s)™ can be connected to one or more upper tier Radiolet(s)™ using a high speed managed link, while upper tier Radiolet(s)™ may be logically connected to each other through the Internet. Adequate security and redundancy can be provisioned between the lower tier Radiolet(s)™ and the upper tier Radiolet(s)™ as required or desired.

The lower tier Radiolet(s)™ can comprise one or more servers and storage devices, and can be located at a local switching office of a mobile data network operator. The location of the lower tier Radiolet™ may depend on transportation costs, for example (and/or other factors). A plurality of cell sites can also be aggregated at the local switching office. In one embodiment, an optimal location for the lower tier Radiolet™ can be a location that is relatively close to subscribers, but yet does not require significant capital expenditure. The lower tier Radiolet(s)™ can be physically connected to a layer 2 or layer 3 switch, where the layer 2 switch provides connectivity from the local switching office to a regional switching office, and the layer 3 switch provides connectivity from the regional switching office to a central switching office, or a router that is part of the overall network in a local switching office of a mobile data network. In one exemplary embodiment of this disclosure, during operation, the lower tier Radiolet(s)™ may be configured to provide one or more of the following functions: passively monitor control signaling messages (for example, A11 messages in an High Rata Packet Data (HRPD) standards based mobile data network) and extract relevant parameters while processing of and responding to said controlling signaling messages (for example A11 messages in an HRPD standards based mobile data network) is handled by network elements in the packet core (for example a Packet Data Service Node (PDSN) in and HRPD standards based mobile data network); encapsulate and tunnel data traffic packets (for example, A10 packets in an HRPD standards based mobile data network) for bearer packets; potentially communicate with the upper tier Radiolet(s)™ to dynamically fetch the content data, which can be based on the business relationship with over-the-top (OTT) content and application partners, where the OTT partners can be any provider of mobile content or application data; be a serving point for the subscriber Internet protocol (IP) sessions, which means that a subscriber IP session is not extended up to the upper tier Radiolet(s)™; process dynamic content, support content caching and storage, which can be used for accelerated and efficient content delivery; communicate with the operator proxy Radiolet(s)™ to send and receive messages to policy and charging rules function (e.g., PCRF) servers, real time mediation device (RTMD) and authentication, authorization, and accounting (e.g., AAA) servers; work with the operator proxy Radiolet(s)™ to enable content layer mobility during network mobility events (for example, layer two handoffs or inter-packet control function (PCF) handoff in an HRPD standards based mobile network); network and application layer quality of service (QoS) enablement; and work with operator owned lawful intercept network elements.

In another exemplary embodiment of this disclosure, the said tunneling and delivery of data traffic packets (for example, A10 messages in an HRPD standards based mobile data network) is achieved without any extraction of parameters contained in control signaling messages (for example, A11 messages in an HRPD standards based mobile data network) but instead through a combination of an automated learning method that observes packet flows between the packet core and RAN as well interfaces with existing management nodes and billing as well as accounting systems in the operator network.

The upper tier Radiolet(s)™ can comprise one or more servers and storage devices located in a hosting datacenter(s) external to operator networks. The upper tier Radiolet(s)™ can serve multiple lower tier Radiolets™ across multiple operator networks in a given geographic area. The upper tier Radiolet(s)™ can be physically connected to a layer 2 or layer 3 switch or a router that is part of the overall network in a private or public cloud datacenter. The upper tier Radiolet(s)™ can comprise back to back (B2B) user agents and open application programming interfaces (API) that can interface with multiple application delivery datacenters and third party software products. In one embodiment, the upper tier Radiolet(s)™ may not be co-located or located in the packet core (for example, next to a packet data serving node (PDSN) of an HRPD standards based mobile network) or any point of present (PoP) of a mobile data network, but rather located close to the user outside the mobile data network with a view towards enabling functionality that is typically available at a private application data center or public Internet cloud datacenters. In one embodiment of the operation, the upper tier Radiolet(s)™ can provide one or more of the following functions (but not limited to): support a mobile web services engine coupled with dynamic on demand virtualization to support multiple sessions across multiple content properties; distribute content dynamically to the lower Radiolet(s)™; and serve multiple operator networks. Also, in an exemplary embodiment, any upper tier Radiolet(s)™ can communicate with multiple lower tier Radiolet(s)™ within a given geographic area, through a high speed managed network, which will allow for leveraging of statistical multiplexing gains, without any impact on content distribution, application delivery, and corresponding service assurance.

In an exemplary embodiment, a system according to the present disclosure can also include a lower tier network of proxy servers (herein referred to as "operator proxy Radiolet (s)™") and an upper tier network of proxy servers (herein referred to as "over the top proxy Radiolet(s)™"). The operator proxy Radiolet(s)™ can be configured to support interfaces to billing and policy enforcement in the operator network. The operator proxy Radiolet(s)™ can be configured to facilitate proxying of messages from a plurality of lower tier Radiolet(s)™ towards an accounting server (for example, a AAA server), and towards a billing server (for example, towards a diameter based billing system), and towards a policy server (a PCRF server, for example, in HRPD standards based systems). In one embodiment of the present disclosure, the operator proxy Radiolet(s)™ can facilitate content layer mobility during inter-PCF handoff (in an HRPD network). The operator proxy Radiolet(s)™ can be located relatively close to the packet core (for example close to a PDSN in and HRPD based mobile data network). The over the top proxy Radiolet(s)™ can be located in a large geographic area and can support interfaces to metering and application policies across multiple content and application datacenters, or customized to support specific large application provider in a private datacenter of the said application provider. The location of the both operator and over the top proxy Radiolets™ may depend on transportation costs, operations costs, and other costs for example (and/or other factors including business agreements and policies).

The present disclosure can provide means for supporting content and application layer mobility which exploits two tier network architecture and can include a distributed network management system that provides high availability managed services with or without any tight integration to operator network management systems or content eco-system datacenter network management systems. The present disclosure can also provide means for interfacing to content or application eco-system partner datacenters, as well as mobile data network operator partner networks that can be customized based on various requirements. The present disclosure can also provide means for supporting specialized services such as, for example, mobile streaming, peer to peer communications services, and real time TV services to mobile subscribers.

In another exemplary embodiment, data is fetched from various participating Internet sites and/or enterprise datacenters, and made available to one or more upper tier Radiolet™ locations. The data can include, but is not limited to, content, media feeds, and application data. One or more of the upper tier Radiolet(s)™ obtains the data, following which the data can be replicated across multiple other upper tier Radiolet(s)™ in multiple locations. The choice of other upper tier Radiolet(s)™ that obtain data from the upper tier Radiolet(s)™ may depend on various static and dynamic rules. Exemplary static rules may include content types and policies provided in advance by content partners, where content partners can be any providers of mobile content or data, and dynamic rules may be created periodically based on outputs of intelligent content management algorithms. The data may then be replicated in one or more lower tier Radiolet(s)™. The lower tier Radiolet(s)™ can fetch the data from the upper tier Radiolet(s)™ or the upper tier Radiolet(s)™ can distribute the data to the lower tier Radiolet(s)™. Parameters for deciding which pieces of data are stored in a given lower tier Radiolet™ may be based on the frequency of requests for the same piece of data (for example, the popularity of data), networking, datacenter, and business policies, or any other desired parameters.

When a subscriber mobile device requests for traffic data, this request may be delivered to the lower tier Radiolet(s)™ in the network that is closest to the subscriber. In one exemplary embodiment of this disclosure, the closest lower tier Radiolet(s)™ to the subscriber can be located at the local switching office where the traffic request from the subscriber is received. Directing the traffic request to the closest lower tier Radiolet(s)™ may include identifying and separating traffic packets from network signaling and application layer signaling packets (from the subscriber mobile device). In one embodiment, such identification and separation can be implemented in a switch that manages and communicates across all lower tier Radiolets™. Then, all network signaling data may be sent directly to the mobile packet core network, where the core network can comprise various servers providing various particular functions such as, for example (and without limitation), policy and charging rules function (e.g., PCRF) servers, real time mediation device (e.g., RTMD) and authentication, authorization, and accounting (e.g., AAA) servers, and packet data serving node (PDSN) servers, or other network elements known in the art. Similarly, application signaling packets may be sent to appropriate application provider data centers. Next, all data packets that are not signaling may be declared as traffic packets, and directed to the lower tier Radiolet(s)™. The lower tier Radiolet(s)™ may then create a temporary instance of the content/media/application session and service the request in a manner similar to an existing content/media/application server in a cloud datacenter. In one embodiment, the said content/media/application server may create a flow control protocol session such as, for example, a transmission control protocol (TCP) session, with the subscriber mobile device using existing Internet protocols, and deliver traffic data as a flow control protocol, or for example, a TCP, datagram. Following completion of the content/media/application session, additional sessions from the same or different subscriber mobile device(s) may then be processed using the same procedures. In an embodiment, a wireless link is shared across multiple users, and multiple cell towers or wireless access devices are aggregated at a given local switching office, and accordingly, a given lower tier Radiolet™ server can process and serve multiple user requests as well as re-use the same hardware and software to support multiple users across time.

Figure 3:
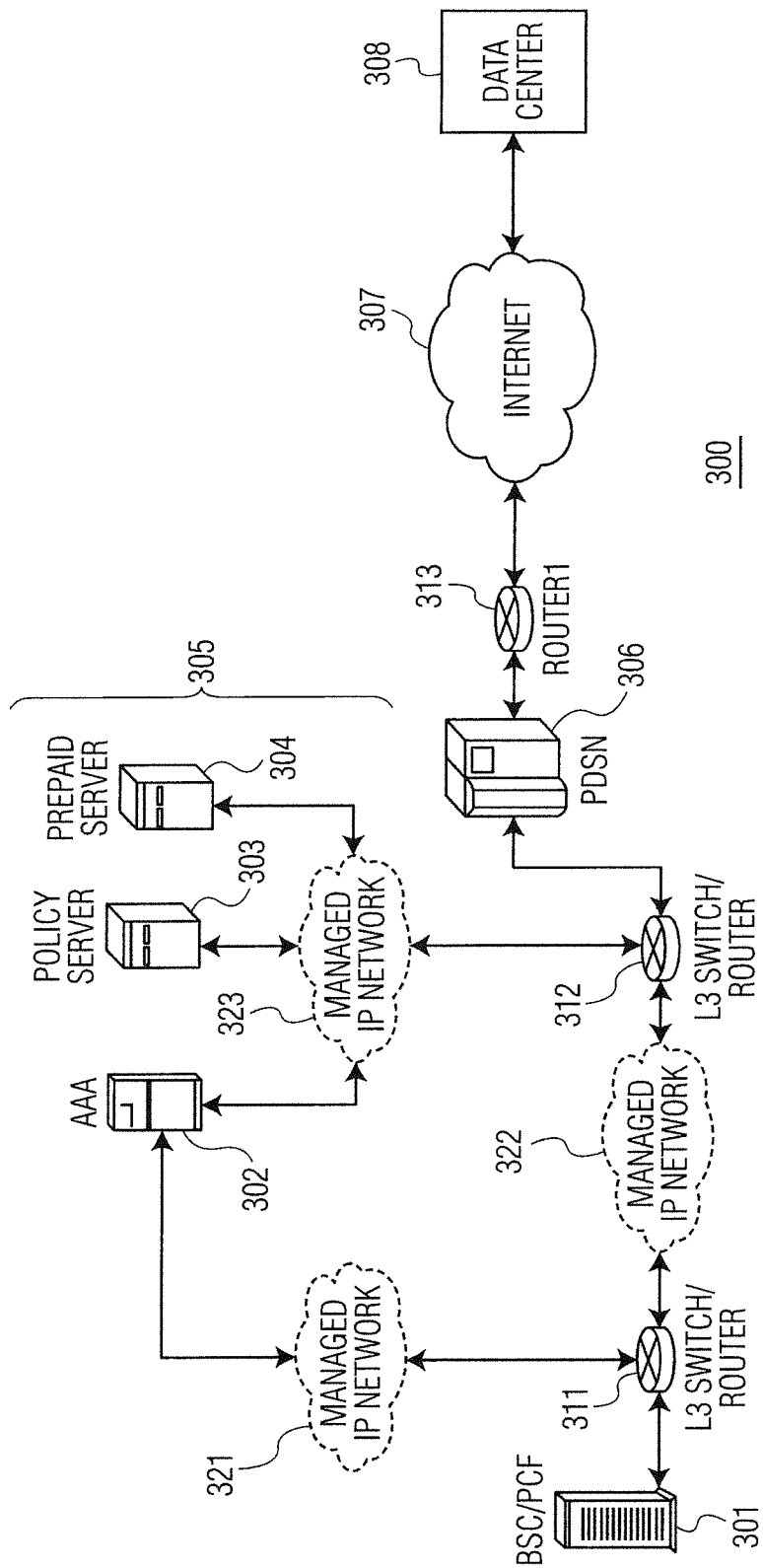
FIG. 3 illustrates an exemplary mobile communications network in an exemplary 3G network excluding the Radio Access Network (RAN) according to an exemplary embodiment of the present disclosure.

Turning now to FIG. 3, an exemplary mobile communications network 300 in an exemplary 3G network excluding the Radio Access Network (RAN) according to an exemplary embodiment of the present disclosure is shown. The exemplary mobile communications network can comprise any type of mobile communications network, including (without limitation) a High Rate Packet Data (HRPD) network, a High Speed Packet Access (HSPA) network, or a Long-Term Evolution (LTE) network, for example.

The exemplary network 300 includes a base station controller and packet control function (BSC/PCF) network element or servers 301 that can be located at a local switching office (not shown). Notably, it should be understood that exemplary network element 301 can be a Radio Network Controller (RNC) of a HSPA based network or an S-1 aggregator element of an LTE based network, for example. The local switching office can be in communication with one or more cell sites (not shown) where the cell sites receive data requests from one or more subscriber mobile devices (not shown). The subscriber mobile device can be any device that can be utilized in a mobile data network including, for example, cell phones, personal digital assistant (PDA) devices, laptops, smart phones, tablets, etc. In operation, the base station controller and packet control function (BSC/PCF) server 101 (or an RNC of an HSPA network) sends and/or receives data or information to a mobile data network interface 305 where the mobile interface 105 may include an AAA server 302, a policy server 303 and a prepaid server 304. The BSC/PCF server 301 represents a layer 2 termination point in a HRPD network. In a HSPA network, this element may be called a Radio Network Controlled (RNC), and in a LTE network, this element may be called an S-1 interface aggregator.

The BSC/PCF server of an HRPD network 301 (or its equivalent in HSPA or LTE network) is in communication with the mobile data network interface 305 via an L2 switch or L3 switch or policy based router (PBR) switch, or a general purpose router 311 and a managed IP network 321. The BSC/PCF server 301 is also in communication with the mobile data network interface 305 via a L2 switch or L3 switch or PBR switch or general purpose router 312 and managed IP networks 322 and 323. In an HRPD network, the BSC/PCF server 301 is in communication with a PDSN server 306 via a L2 switch or L3 switch or PBR switch or general purpose router 311, a managed IP network 322 and L2 switch or L3 switch or PBR switch or router 312. In one embodiment of this disclosure, the PDSN server 306 may communicate with an Internet datacenter 308 through a router 313 over an Internet connection 307 (or any other wired or wireless communications link). The PDSN server 306 can provide management functions (e.g., IP address allocation, content filtering, and session recovery), data functions (e.g., interface for traffic data messages, policing of traffic data messages, and deep data packet inspection) and control functions (e.g., interface for signaling data messages, routing of data, and acting as virtual local area network (VLAN)).

In one embodiment of this disclosure, during normal operation, the BSC/PCF server 301 sends data request(s) received from a subscriber mobile device to the PDSN server 306. The PDSN server 106 in turn sends the data request(s) to the Internet datacenter 308 though the Internet connection 107 (or any other wired or wireless communications link). The Internet datacenter 308, in response to the data request(s), sends requested data to the PDSN server 306 via the Internet connection 307 and through router 313. The PDSN server 306 then sends the requested data to the BSC/PCF server 301 using one or more switches/routers (e.g., L2 switch, L3 switch, or PBR switch, or router 311, 312) over one or more managed IP networks 322. Once the requested data is received at the BSC/PCF server 101, it may be sent to the subscriber mobile device (that made the initial data request) via the cell site (not shown).

Figure 4:
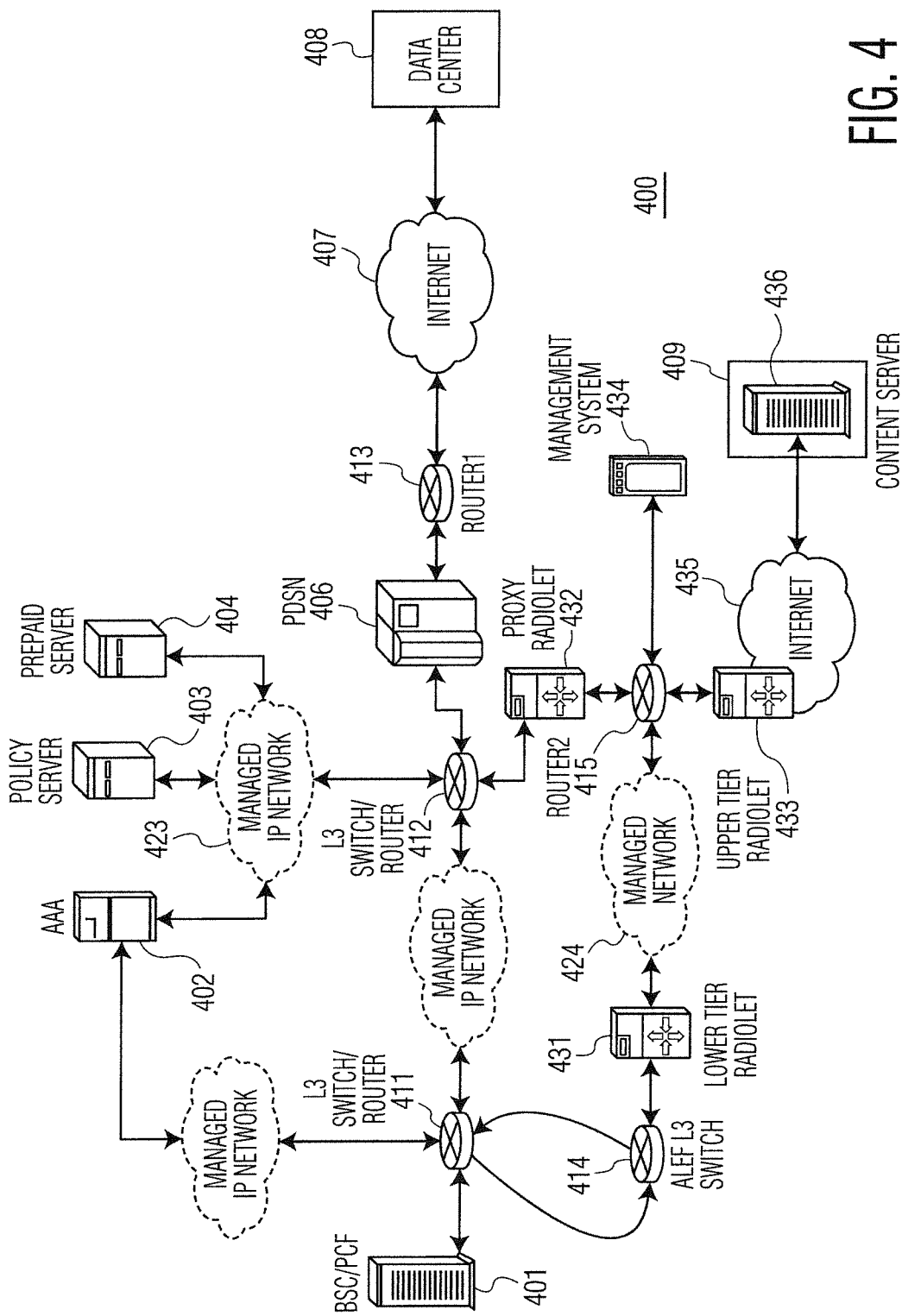
FIG. 4 illustrates an exemplary network signaling data flow pathway and an exemplary traffic data flow pathway according to an exemplary embodiment of the present disclosure.

Turning now to FIG. 4, an exemplary mobile communications network 400 according to an exemplary embodiment of the present disclosure is shown. The exemplary mobile communications network 400 may comprise any type of mobile communications network including (without limitation) a High Rate Packet Data (HRPD) network, a High Speed Packet Access (HSPA) network, or a Long-Term Evolution (LTE) network, or operator owned WiFi access network managed through a common centralized packet core network, for example.

Included in this exemplary network 400 is an upper tier Radiolet™ 433 comprising at least one processor executing computer-readable instructions that receives data extracted from for example an Internet datacenter 409 (or a private cloud datacenter or privately owned application datacenter or any other type of datacenter) through an Internet connection 435 (or via any other wired or wireless communications link). Notably, although the exemplary network 400 depicts a single upper tier Radiolet™ 433, it should be understood that a system according to the present disclosure may include any number of upper tier Radiolets™.

The upper tier Radiolet™ 433 is located at or proximal to, for example, an Internet datacenter 409, which in this exemplary network 400 includes a content server 436, and the content server 436 is in direct communication with Internet datacenter 409 via Internet connection 435 (or any other wired or wireless communications link). The content server 436 may obtain data from the Internet datacenter 409. In one embodiment, the Internet datacenter 409 comprises datacenter 408. The Internet datacenter may optionally comprise at least one of a public and privately owned datacenter.

In another embodiment, the upper tier Radiolet™ 433 replicates at least a portion of the data extracted from the Internet datacenter 409 and transmits the replicated data to another or a plurality of upper tier Radiolet(s)™ (not shown). Notably, the upper tier Radiolet™ 433 may be located across a plurality of locations. The upper tier Radiolet™ 433 and the other upper tier Radiolet™ (not shown) may be in communication with each other via at least one of a wired and wireless communications link.

In another embodiment, one or more over the top proxy Radiolets™ (not shown), positioned between the Internet datacenter 409 and the upper tier Radiolet™ 433, may be configured to extract the data extracted from the Internet datacenter 409 and distribute the data extracted from the Internet datacenter 409 to the upper tier Radiolet™ 433. These over the top proxy Radiolet(s)™ (not shown) may each comprise at least one processor executing computer-readable instructions to perform its various functions.

The upper tier Radiolet™ 233 may further be configured to distribute at least a portion of the received data to one or more lower tier Radiolets™ 431 upon request from the lower Radiolet(s)™ or pushed directly without request based on configured policies. Although this exemplary network depicts a single lower tier Radiolet™ 431, it should be understood that a system according to the present disclosure may include any number of lower tier Radiolets™ in a given region.

As shown in this exemplary network 400, the lower tier Radiolet™ 431 may be located closer to the source of the data request (e.g., BSC/PCF sever 201) than the Internet datacenter 409. Notably, "closer to the source" may be measured in terms of network distance rather than physical distance. In an embodiment, the lower tier Radiolet™ 431 may be located at or proximal to a local switching site of a mobile data network 400. In another embodiment, the lower tier Radiolet™ 431 may be located between the BSC/PCF server 401 and the PDSN server 406 of the mobile data network 400 of an HRPD standards based mobile data network. In yet another embodiment, the lower tier Radiolet™ 431 may be located at every BSC/PCF server 401 of a mobile data network 400. In yet another embodiment, the lower tier Radiolet™ is placed between the cell site and the local switching office at a natural aggregation site.

The lower tier Radiolet™ 431 is shown in communication with the upper tier Radiolet™ 433 via at least one router/switch 415 over a managed network 424 (or any other wired or wireless communications link). The upper tier Radiolet™ 433 may be configured to select the data that is distributed to the lower tier Radiolet™ 431 based on one or more of: a frequency of requests for a particular type of data, one or more networking policies, one or more datacenter policies and one or more business policies. Alternatively, (or additionally), the lower tier Radiolet™ 431 may be configured to fetch data from the upper tier Radiolet™ 433. The lower tier Radiolet™ 431 may also be configured to store portions of any received (or fetched) data, as well as perform one or more of the following functions: processing dynamic content data, including (without limitation) manipulating inputted data to produce output data, content caching and storing data. To do this, the lower tier Radiolet™ 431 may comprise at least one processor executing computer readable instructions to perform its various functions.

In operation, the lower tier Radiolet™ 431 may receive a data request from, for example, the BSC/PCF server 401 via the L2/L3/PBR switch or router 414 and the L2/L3/PBR switch or router 411. In an embodiment, the data request may be received at the lower tier Radiolet™ 431 that is located closest to the source of said data request. In another embodiment, the lower tier Radiolet™ 431 may be located at a local switching site that receives the data request prior to transmitting the data request to said lower tier Radiolet™ 431.

The lower tier Radiolet™ 431 may transmit, in response to said data request, data from the portion of received data to a source of the data request. The lower tier Radiolet™ 431 may establish a flow control protocol session between the lower tier Radiolet™ 431 and the source of the data request. The lower tier Radiolet™ 431 may then transmit the traffic data to the source of the data request as a flow control protocol datagram.

In another embodiment, one or more operator proxy Radiolets™ 432 may receive data and information extracted from at least one server, for example the AAA server 402, the policy server 403, and/or the prepaid server 404 of a core network of the mobile data network 400 via L2/L3/PBR switch/router 412 and managed IP network 423. Although this exemplary network 400 depicts a single operator proxy Radiolet™ 432, it should be understood that a system according to the present disclosure may include any number of operator proxy Radiolets™.

The operator proxy Radiolet™ 432 may transmit at least a portion of the extracted information to the lower tier Radiolet™ 431, via a router 415 over a managed network 424 (or any other wired or wireless communications link). The extracted information may comprise information from an authentication, authorization and accounting (e.g., AAA) server, information from a policy and charging rules function (e.g., PCRF) server, information from a real time mediation device (e.g., RTMD) server and/or information and data from any other type of server or source. In this way, the operator proxy Radiolet™ 432 can support and implement various fee-charging and policing interfaces (or any other policy, security, management, business, etc. interfaces) as part of the mobile communications network 400.

In an embodiment, the AAA server 402 may communicate with the PDSN server 406 using a networking protocol, such as Remote Authentication Dial In User Service (RADIUS), for example, to provide subscriber authentication information to the PDSN server 406 during a subscriber session. The RADIUS protocol can be a networking protocol that provides authentication, authorization and accounting management for subscribers. The operator proxy Radiolet™ 432 may request and receive a portion of the information from the AAA server 402 via a router or switch 412 and a managed IP network 423. The operator proxy Radiolet™ 432 provides the information (e.g., subscriber information and session accounting information) from the AAA server 402 to the lower tier Radiolet™ 231 via router 415 and managed network 424.

In another embodiment, the policy server 403 may optionally be a PCRF server. In operation, the operator proxy Radiolet™ 432 communicates and interfaces with the PCRF server using Gx protocols, for example, where Gx is an online policy interface between the PDSN and the PCRF, via router or switch 412 and a managed IP network 423. The operator proxy Radiolet™ 432 provides information from the PCRF server to the lower tier Radiolet™ 431, via router 415 and managed network 224, that may be used to control policy functions (e.g., credit control request update and credit control request termination).

The prepaid server 404 may optionally comprise a RTMD server. The operator proxy Radiolet™ 432 optionally communicates and interfaces with the RTMD server using Diameter Gy protocols (e.g., Diameter Credit-Control (DCCA) protocol), for example, where Gy is an online charging interface between the PDSN 406 and the RTMD servers, via router or switch 412 and a managed IP network 423. The operator proxy Radiolet™ 432 provides information from the RTMD to the lower tier Radiolet™ 431, via for example router 415 and managed network 424, that may be used to tag subscriber sessions as "prepaid" based on profile information of the subscriber session.

In an embodiment, postpaid charging functions involve a RADIUS server (not shown) in communication with the lower tier Radiolet™ 431 via an operator proxy Radiolet™ 432. In such an embodiment, the PDSN server 406 collects radio specific parameters (e.g., Airlink Records) from a Radio Access Network (RAN) and combines the radio specific parameters with IP network specific parameters to form one or more Usage Data Records (UDR). The PDSN server 406 can use RADIUS protocols to send the UDR information to the RADIUS server. Each UDR data packet may be associated with a correlation ID, which identifies accounting records generated for a particular subscriber session and is provided to the RADIUS server by the PDSN server 406 at the time authentication and authorization of accounting information is performed.

Similarly, in one embodiment, the operator proxy Radiolet™ 432 may collect radio specific parameters from the RAN and combine the radio specific parameters with IP network specific parameters to form UDR, and use RADIUS protocols to send the UDR information to the RADIUS server (not shown). Optionally, the operator proxy Radiolet™ 432 may maintain the UDR information until it receives confirmation that the RADIUS server has properly received the information. If no confirmation is received from the RADIUS server within a period of time, the operator proxy Radiolet™ 432 may retransmit the UDR information to the RADIUS server. The operator proxy Radiolet™ 432 may transmit the UDR information to other RADIUS servers.

In one embodiment, various events that trigger the PDSN server 406 to take accounting action and send the UDR information may include (without limitation) traffic data (e.g., A10 messages) connection termination at the PDSN server 406, data service establishment, PPP renegotiations on the PDSN server 406, arrival of subscriber data, and timer expiration. Various events that cause the PDSN server 406 to stop sending UDR information may include (without limitation), an existing A10 connection is closed, an IP flow is removed from the corresponding A10, and the PDSN server 406 determines the packet data session associated with the Correlation ID has ended.

The operator proxy Radiolet™ 432 may not require an event to trigger accounting action, but may require an event to trigger UDR termination including (without limitation) subscriber session termination or IP flow termination.

In another embodiment, the lower tier Radiolet™ 431 may receive data or information from a management system server 434 via at least one router/switch 415 over a managed network 424 (or any other wired or wireless communications link). One or more management system servers 434 may monitor the upper tier Radiolet™ 433 and lower tier Radiolet™ 431 (e.g., monitoring the number of active IP tunneled sessions, the bandwidth usage of the subscriber sessions, the nature of the data requests, and the frequency of network usage).

Figure 5:
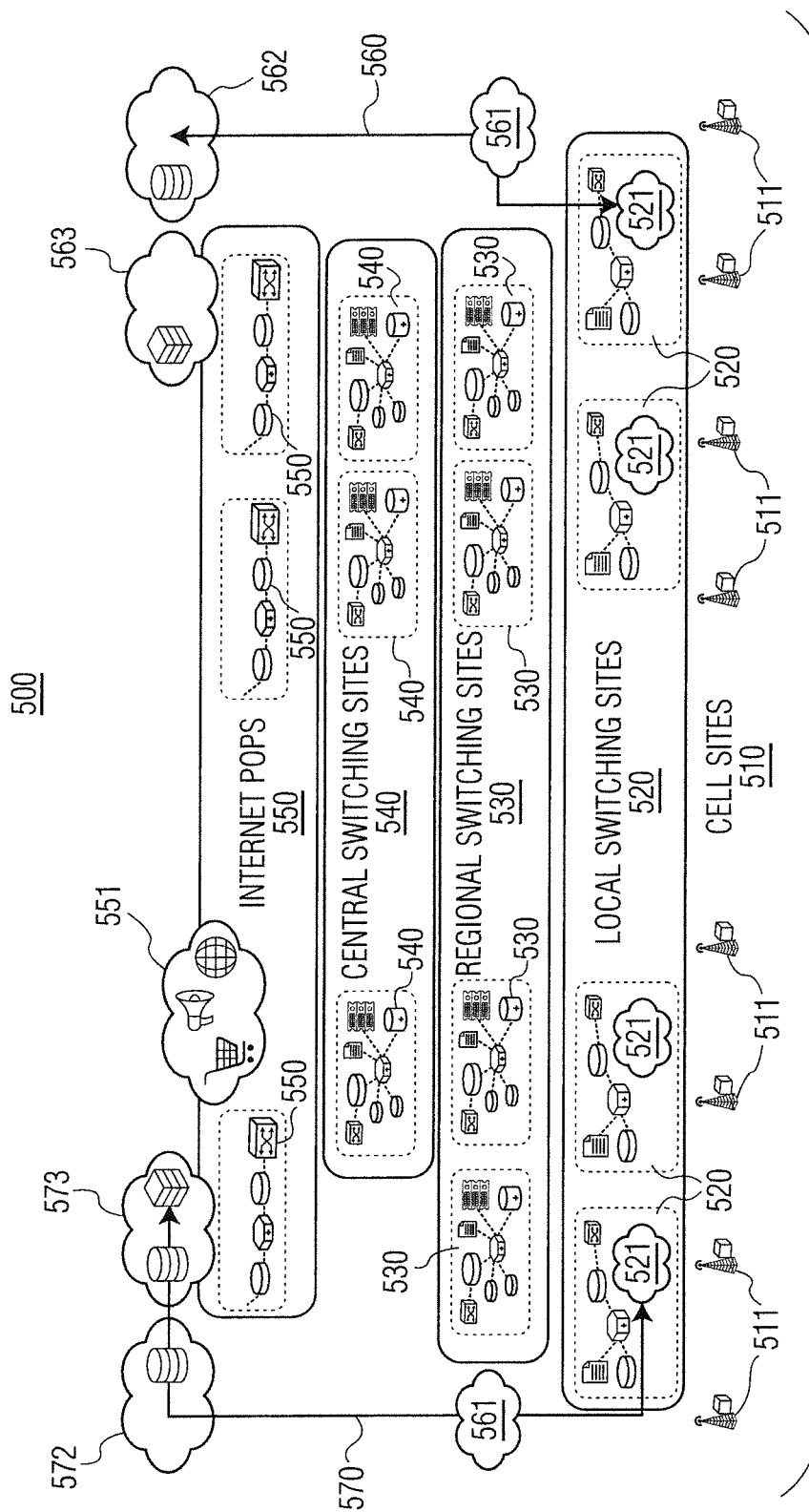
FIG. 5 illustrates an exemplary mobility-cloud interconnect framework according to an exemplary embodiment of the present disclosure.

Turning now to FIG. 5, FIG. 5 illustrates an exemplary mobility-cloud interconnect framework 500 according to an exemplary embodiment of the present disclosure. A mobility network comprises cell sites 510 comprising base stations 511, local switching sites 520, regional switching sites 530, central switching sites 540, and Internet POPs 550, and app clouds 551, 562, 563, 572, and 573 (for example as also illustrated in FIGS. 1 and 2). The present disclosure can solve the Mobile Middle Mile™ problem, described above, by implementing lower tier Radiolets™ 520 deployed inside operator local switching offices 520 and upper tier Radiolets™ 561 in local cloud datacenters. In this way, traffic can be handled locally and can eliminate the Mobile Middle Mile™. Low routed distance links 570 and 560 between the app clouds 551, 562, 563, 572, and 573 and the upper tier Radiolets™ 561 and the lower tier Radiolets™ 521 can bypass the mobile network.

The present disclosure can simplify the application first mile, for example, by implementing upper tier Radiolets™ with local client agents to aggregate multiple transmission control protocol (TCP) connections to multiple app servers from a single client session and the client side connection can be streamlined to one connection. The present disclosure can eliminate the Mobile Middle Mile™ through the radio-edge interconnect. The present disclosure can "unclog" the wireless last mile through algorithms and optimizations. For example, cross-layer optimization algorithms and shared wireless links can increase the number of app sessions per unit time.

The present disclosure can centralize management and control functions (both network and application). The present disclosure can intelligently move traffic packets, application data, and non-control app logic closer to the user (e.g., closer to the radio edge). The present disclosure implements a two-tier architecture with clear separation of network and application interfaces. For example, the lower tier is in between the RAN and packet core of the mobility network and the upper tier is in between the application front-end and application back-end. The lower tier can be a network "middle end" and the upper tier can be an application "middle end". The adaptive overlay of the present disclosure does not require upgrades to the mobile network or application data center. The present disclosure can comprise intelligent algorithms, for example inspired by wide area network (WAN) optimization, and can be applied at the RAN.

Figure 6:
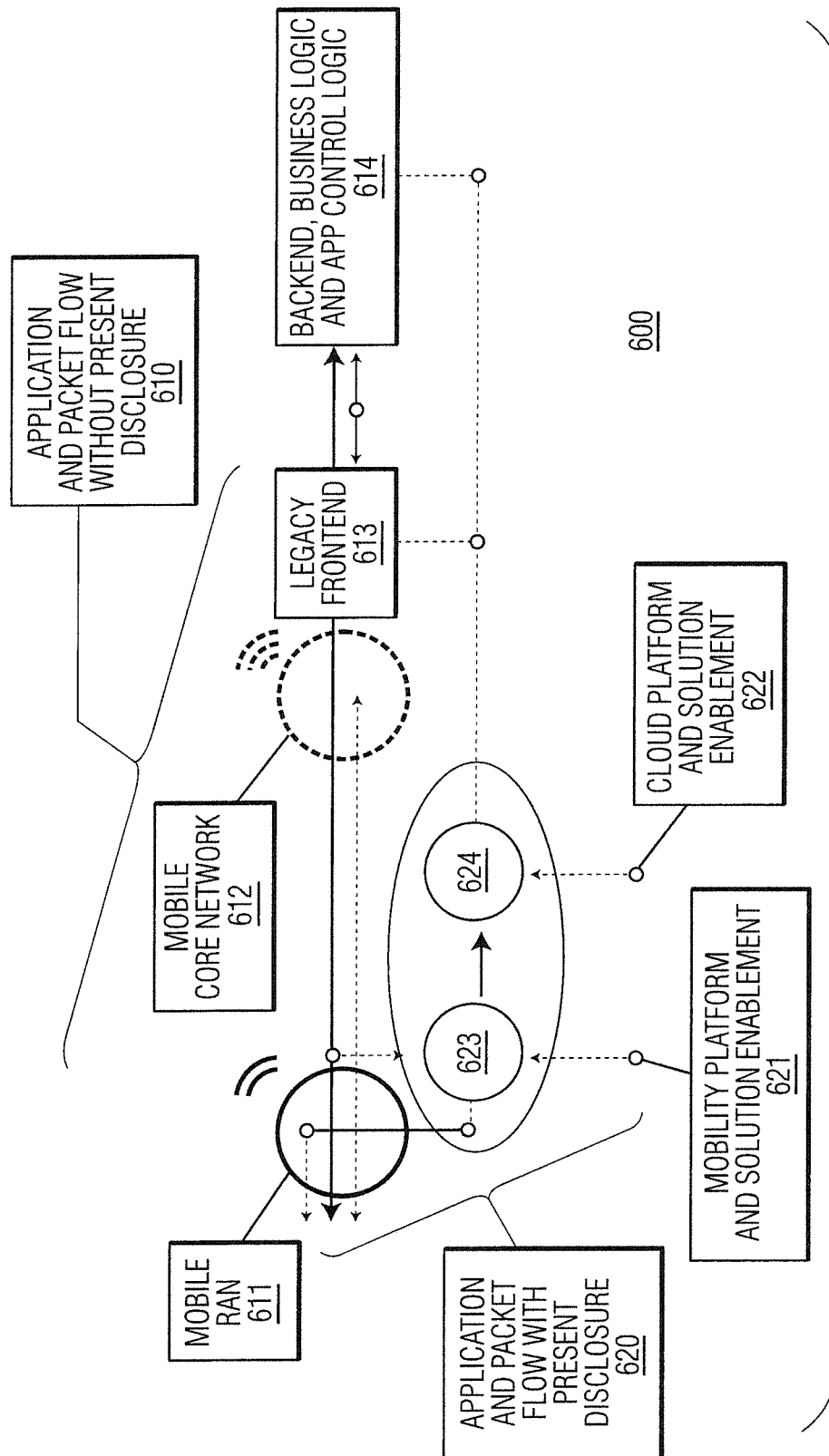
FIG. 6 illustrates an exemplary flow diagram of application and packet flow according to an exemplary embodiment of the present disclosure.

Turning now to FIG. 6, FIG. 6 illustrates an exemplary flow diagram of application and packet flow 600 according to an exemplary embodiment of the present disclosure. The application and packet flow without the present disclosure 610 comprises a packet flow from the mobile RAN 611, to the mobile core network 612, to the legacy frontend 613, to the backend, business logic and app control logic 614. The application and packet flow with the present disclosure 620 comprises a mobility platform and solution enablement 621 communicating, via one or more networks, with the lower tier radiolet 623 and a cloud platform and solution enablement 622 communicating via one or more networks, with the upper tier radiolet 624. The packet flow is from the mobile RAN 611 to the lower tier radiolet 623 and to the upper tier radiolet 624. The mobility platform and solution enablement 621 moves traffic functions to the radio edge and the cloud platform and solution enablement 622 moves application data and non-control application logic closer to a user. FIG. 6 illustrates a two-tier mobility cloud interconnect platform and solutions enablement system according to the present disclosure. The two-tier system preserves the control plane (e.g., as illustrated by the dotted lines) as-is and allows for both mobility control and application control.

The fundamental approach to applying "mobility to the cloud" that is described herein, (e.g., as illustrated in FIGS. 3-6), comprises three basic principles: 1) hyper-distribution of access and functions that migrate with the user; 2) optimization and interaction across layers of the stack, and 3) solution stacks that abet vertical digital services provisioning.

A hyper-distributed network of mobility-cloud interconnect points of presence can create "virtual and mobile app instances" closer to the user and can migrate with the user, via an adaptive overlay network of networks, with no upgrades to mobile networks or app datacenters. This basic idea is counter-intuitive, for example, the "cloud" comprises computing hardware/software that is centralized and one that is "fixed" (i.e., does not, and is not intended to "migrate" with the user). The present disclosure solves the problem using the architectural framework described above and illustrated, for example, in FIGS. 3-6. As described above, the present disclosure comprises a "two-tier" network of networks. Each tier may in-turn may be hierarchical. For example, in the lower tier of mobility, there can be concentric circles of upper tier Radiolets™, before reaching concentric circles of lower tier Radiolets™ (e.g., all such lower tier Radiolets™ inside an operator's network). For example, as illustrated in FIG. 5, there can be lower tier Radiolets™ in every category of switching offices and at cell sites, which creates a natural hierarchy. Similarly, there can be upper tier Radiolets™ in proximity with different layers of lower tier Radiolet™, which can be a general architecture.

The lower tier can comprise of a distributed set of network insertion platforms. In one embodiment of the present disclosure, these mobility network insertion platforms can comprise of software executed on off-the-shelf hardware and each installation can comprise of a small micro-rack worth of servers. In another embodiment, each installation of such micro-racks can be co-located inside a mobile operator network at the edge of the Radio Access Network (also called the "radio edge"). In yet another embodiment, for example for 4$^{th}$ Generation (e.g., LTE) networks, lower tier Radiolets™ can be installed at the cell-site. Similarly, for in-building installations with small cells, lower tier Radiolets™ can be installed in-building in a local switching room. For example, software corresponding to a lower tier network of insertion platforms can be instantiated in a lower tier Radiolet™.

The upper tier can comprise of a distributed set of application delivery frameworks. In one embodiment of the present disclosure, these app and cloud delivery frameworks can comprise of software executed on off-the-shelf hardware and each installation can comprise of a small micro-rack worth of servers. In another embodiment, each installation of such micro-racks can be co-located inside a local application datacenter but in proximity to the radio edge of multiple Radio Access Networks (e.g., across operators serving in an area). For example, software corresponding to an upper tier network of insertion platforms can be instantiated in an upper tier Radiolet™.

The present disclosure can comprise a collection of lower-tier mobility network insertion points in a geographic area interconnected to a local upper-tier app and cloud delivery framework installation supporting, for example (without limitation): standardized but potentially multiple, protocol interfaces; multiple data types; locality and are distributed; transfer of data and logic across the two-tiers, with a view towards cross layer optimization between the mobility network and app cloud.

The present disclosure can comprise intelligent mobility API's, as well as app and cloud SDK's, exposed at the radio edge, for example (without limitation): API's and SDK's as software modules in a platform, that can be easily invoked. For example, an Information API's could be just a JavaScript Object Notation (JSON) file stored in software and addressable using HTTP or HTTPS. SDK's can be downloadable and can compiled with the object code of the application back end. Exposing the intelligent mobility API's and app and cloud SDK's between the two tiers can allow for cross layer optimization across multiple layers of the OSI stack and can accelerate the roll out of new products and features, by providing open integration environments. This can create new business lines for mobile network operators by exposing various internal network assets. The intelligent mobility API's can comprise multiple categories, including for example (without limitation): Optimization API's that allow for performance improvements across multiple layers of the OSI stack; Information API's which do not compromise on the privacy of the subscriber or network; and Service API's that allow a larger ecosystem of app providers to re-use various assets within an operator network. The present disclosure also can provide for vertical market facing solutions and aggregation that can enable new mobile digital services, including for example (without limitation): Mobile Commerce Solutions Enablement; Mobile Media and Entertainment Solutions Enablement; Enterprise Mobility Solutions Enablement (e.g., Mobility Solutions Enablement for Hospitality); Mobile Travel Aggregation Solutions Enablement; Mobile Social Media Solutions Enablement; etc.

In one embodiment, the present disclosure comprises systems of providing application mobility comprising at least one mobility networking module implemented in at least one lower tier Radiolet™ and comprising at least one processor executing computer readable instructions that cause the at least one mobility network module to perform one or more traffic data plane functions. The software defined mobility networking (SDMN) functional module can comprise of implementing the traffic plane functions of the access network session in a distributed or hyper-distributed manner, while retaining management plane and control plane functions in a centralized packet core of an operator network. The traffic data plane functions can be implemented in a distributed manner in the at least one lower tier Radiolet™. The management plane and control plane functions can be implemented in an operator proxy Radiolet™.

The traffic plane data may be directed to pass through another mobile data network or more generally another Internet Protocol (IP) based data network. This allows for traffic plane functions to interact directly with the app layer, while retaining billing, policy, security, and other control/management plane functions in a centralized core. The traffic functions may be moved closer to the user without requiring upgrades to existing network or datacenters. In one embodiment, the traffic plane can be implemented in a distributed manner in a lower tier Radiolet™ while the management plane functions corresponding to billing, policy enforcement, compliance, and other related functions are implemented in a centralized network element referred to as an operator proxy Radiolet™ In one embodiment, the signaling functions in the control plane can be implemented in existing packet core elements thereby ensuring no network upgrades are necessary. In one embodiment, the software architecture comprises hundreds of atomic functional elements that are germane to the mobility networking stack followed by packet processing driver routines which can be pre-created as well as auto-created based on active network states and policies.

The present disclosure can comprise at least one mobility application module implemented in at least one upper tier Radiolet™ and comprising at least one processor executing computer readable instructions that cause the at least one mobility network module to perform one or more application data plane functions. The software defined mobility app framework (SDMAF) functional module can comprise of implementing just the application data plane functions of an app session, in a distributed or hyper-distributed manner in the at least one upper tier Radiolet™, while retaining management plane and control plane functions in centralized modules of an application provider data center. The management plane and control plane functions can be implemented in an over the top proxy (OTT) Radiolet™.

This allows for application date plane functions to interact with the network layer, while retaining metering, policy, security, and other control/management plane functions in a centralized app provider data center. In one embodiment of the present disclosure, the application data plane is implemented in a distributed manner in an upper tier Radiolet™ while the management plane functions corresponding to billing, policy enforcement, compliance, and other related functions are implemented in a centralized network element referred to as an OTT Proxy Radiolet™. In another embodiment, the signaling functions in the control plane can be implemented in existing app core network elements thereby ensuring no application data center upgrades are necessary. In another embodiment, the software architecture comprises hundreds of atomic micro-services that are germane to various applications followed by session delivery driver routines which can be pre-created as well as auto-created based on active application states and policies.

The present disclosure can comprise at least one mobility cloud module implemented in the at least one lower tier Radiolet™ and the at least one upper tier Radiolet™ and comprising at least one processor executing computer readable instructions that cause the at least one mobility cloud module to perform computing execution functions of a cloud session. The software defined mobility cloud framework (SDMCF) functional module can comprise of implementing the containerization plus platforms, and related computing execution functions of a virtualized cloud session, in a distributed or hyper-distributed manner in the at least one lower tier Radiolet™ and the at least one upper tier Radiolet™, while retaining management plane and control plane functions in centralized network elements of a cloud provider datacenter. The management plane and control plane functions can be implemented in a cloud proxy Radiolet™.

For example, in any given server, the base operating system can be virtualized into multiple independent user-space instances (e.g., containers). Each individual container can be treated as an independent machine where application logic can be executed. Since each upper and lower tier Radiolet™ comprises of multiple servers, installed in a distributed fashion, the present disclosure can create a large collection of independent machines that are logically separated, but physically executed in a small collection of servers.

In addition to creating individual containers, standard and application/network specific logging mechanisms can be supported. These logs can be treated as an input to a parsing engine, to create an extensive collection of reports at both the network and application layers. This allows for computing execution plane functions to interact directly with the app and network layers, while retaining control/management plane functions related to container and virtual machine set up in a centralized orchestration element. In one embodiment, this function can be implemented in a distributed manner in both the lower tier Radiolets™ and the upper tier Radiolets™ while the management plane functions are implemented in a centralized network element referred to as a Cloud Proxy Radiolet™. In one embodiment, the signaling functions in the control plane can be implemented in existing orchestration elements thereby ensuring no upgrades to a cloud provider datacenter are necessary. In one embodiment, the software architecture comprises of hundreds of atomic functional elements that are germane to instantiating cloud based virtual machines, and platforms, followed by software infra and platform enablement driver routines which can be pre-created as well as auto-created based on active cloud states and policies.

The present disclosure can comprise at least one interconnect module implemented in the at least one lower tier Radiolet™ and the at least one upper tier Radiolet™ and comprising at least one processor executing computer readable instructions that cause the at least one interconnect module to perform communication functions. The software defined interconnect functional module can form the "go-between" between the SDMN, SDMAP, and SDMCF functional modules. All inter-function communications formats and protocols can be handled by the interconnect functional module. Typical communication methods include, for example (without limitation): file based communications using the File Transfer Protocol (FTP), Enterprise buses (e.g., between software systems, not just modules), Web Services, and Restful API's. Other mechanisms are also applicable, depending on network and/or application functions. In one embodiment, the interconnect functional module is executed in software at both the lower tier and upper tier Radiolets™, and in a distributed manner.

The present disclosure comprises at least one solution module implemented in the at least one lower tier Radiolet™ and the at least one upper tier Radiolet™ and comprising at least one processor executing computer readable instructions that cause the at least one solution module to perform application support and data storage functions. The software defined solution function module can contain the solution logic and the data stores that enable various digital services. The solution logic modules can comprise of software programs which call upon individual software modules (e.g., micro-services) and data stores (e.g., collections of databases of different types). These can be customized solution stacks, that can enable various application providers to offer mobile digital services while providing comprehensive support metering, monitoring, and management. In one embodiment, the solution functional module can be executed in software at both the lower tier and upper tier Radiolets™, and in a distributed manner.

The present disclosure comprises at least one mobility interface module implemented in the at least one lower tier Radiolet™ and the at least one upper tier Radiolet™ and comprising at least one processor executing computer readable instructions that cause the at least one mobility interface module to perform interfacing functions. The software defined mobility API's and Cloud SDK's functional module can comprise of multiple software based protocol architectures with embedded state machines, code books, and interfaces to other software modules and customer interfaces. The interface functions can be the software modules themselves, but expose an underlying software asset (e.g., interface to a software asset). For example, the software assets can be other software programs or data objects/files. In one embodiment, the software mobility interface module can be executed in software at both the lower tier and upper tier Radiolets™, and in a distributed manner.

As described above, applying mobility to apps in the cloud comprises an architectural framework. In one embodiment, applying mobility to apps in the cloud can comprise a software defined approach consisting of multiple functional modules. Applying mobility to apps in the cloud can resolve the fundamental issues in the complex first mile, the long Mobile Middle Mile™, and clogged wireless last mile. As described in the present disclosure, a "Mobility-Cloud Interconnect" system (e.g., comprising of platforms and solution stacks) with distributed deployment and close coordination across layers, allows for connectivity, computing, and curation in the mobile Internet to co-exist. The systems and methods of the present disclosure, when combined with a local optimized instantiation (for example at the radio edge), allows for the creation of a personalized mobility-cloud-app instance close to the user thereby solving the three problems of the complex first mile, the long middle mile, and clogged wireless last mile.

In one embodiment of the present disclosure, instantiation of client agents at an upper tier Radiolet™ allows for aggregation of multiple requests streamlining client side connections across a system of requests to potentially one single connection, leading to a single optimized path from the client to the agent, thereby dramatically simplifying the first mile. In one embodiment, locating lower tier Radiolets™ and the SDMN functional modules at the radio edge allows for traffic to completely by-pass the packet core, thereby effectively eliminating the Mobile Middle Mile™. In one embodiment, a combination of state machines (e.g., for a given user) across multiple requests followed by cross layer optimization methods allow for each individual user session to be more responsive. This in turn can lead to user sessions to be completed faster, leading to more sessions from the same user or new user sessions in a given unit time. Given the shared nature of the wireless last mile, this allows for unclogging of the last mile. The present disclose also provides means for supporting app layer mobility which exploits two tier network architecture and can include a distributed network management system that provides high availability managed services without any operational integration to operator networks or app eco-system datacenters.

In one embodiment, the hyper-distributed nature of a Mobility-Cloud Interconnect System, combined with intelligent Mobility API's and Cloud SDK's, plus a service creation engine customized to each vertical solution, allow for close coordination between all three "miles" and hence the app and network can work in tandem. Through a combination of software defined functional modules, embodiments of which were described above, such a system preserves the control logic centrally (e.g., across the network, cloud, and application) while moving network traffic, app data and non-control app logic, close to the user and executed in a self-contained cloud instance. In addition, the present disclosure provides means for identification of traffic flow data from signaling flow data, and serving content and application data from the lower tier Radiolet™. The signaling flow data, at both the network and app layers, are permitted to pass through an existing mobile telecommunications network that include servers for handling subscriber, session, and mobility management, without any changes as well as an app data center where application layer control logic is handled. The traffic flow data are directed to pass through another mobile telecommunications network. The present disclosure can also provide means for distribution, storage, and delivery of content, as well as hosting of applications from the lower tier Radiolet™, in the other mobile telecommunications network. Still further, the present disclosure provides means for intelligent resource management and flow control methods applied to content delivery and application sessions, which can lead to dramatic improvements in operating efficiency of the end-to-end path across the three miles of the flow.

In another exemplary embodiment, app data is fetched from various participating Internet sites and/or enterprises, and made available to one or more upper tier Radiolet™ locations. The data can include, for example (without limitation): content, media feeds, and application data. One or more of the upper tier Radiolet(s)™ can obtain the data, following which the data can be replicated across multiple other upper tier Radiolet(s)™ in multiple locations. The choice of other upper tier Radiolet(s)™ that obtain data from the upper tier Radiolet(s)™ may depend on various static and dynamic rules. Exemplary static rules may include content types and policies provided in advance by content partners, where content partners can be any providers of mobile content or data, and dynamic rules may be created periodically based on outputs of intelligent content management algorithms. The data may then replicated in one or more lower tier Radiolet(s)™. The lower tier Radiolet(s)™ can fetch the data from the upper tier Radiolet(s)™ or the upper tier Radiolet(s)™ can distribute the data to the lower tier Radiolet(s)™. Parameters for deciding which pieces of data are stored in a given lower tier Radiolet™ may be based on the frequency of requests for the same piece of data (for example, the popularity of data), networking, datacenter, and business policies, or any other desired parameters.

In another exemplary embodiment, one or more microservices with corresponding service logic can act upon the app-data in a manner that is based on app policies or personalized user policies (or a combination) leading to app layer curation where connectivity and computing co-exist.

When a subscriber mobile device opens an app, this triggers a request for data, this request may be delivered to the lower tier Radiolet(s)™ in the network and then on to an upper tier Radiolet™ that is closest to the subscriber. The closest Radiolet(s)™ to the subscriber, along with an interconnect between the upper and lower tiers, can be located at the radio edge, where the traffic request from the subscriber is received. Directing the traffic request to the closest lower tier Radiolet(s)™ can include identifying and separating traffic packets from signaling packets (from the subscriber mobile device). In one embodiment, such identification and separation can be implemented in a switch that manages and communicates across all lower tier Radiolets™.

All signaling data can be sent directly to the core network, where the core network can comprise various servers providing various particular functions such as, for example (and without limitation), policy and charging rules function (PCRF) servers, real time mediation device (RTMD) and authentication, authorization, and accounting (AAA) servers, and packet data serving node (PDSN) servers, or other network elements known in the art. All data packets that are not signaling can be declared as traffic packets, and directed to the lower Radiolet(s)™. The lower tier Radiolet(s)™ may then create a temporary instance of the content/media/application/communication session and in combination with an upper tier Radiolets™ service the request in a manner similar to an existing content/media/application/communication server in a cloud datacenter. In one embodiment, the content/media/application/communication server may create a flow control protocol session such as, for example, a transmission control protocol (TCP) session, with the subscriber mobile device using existing Internet protocols, and deliver traffic data as a flow control protocol, or for example, a TCP, datagram. Following completion of the content/media/application/communication session, additional sessions from the same or different subscriber mobile device(s) may then be processed using the same procedures.

The present disclosure can achieve efficiency improvements through one or more of the following: fundamentally, fetching, storing, and delivering data from the closest lower tier Radiolet(s)™, and/or routing mobile to mobile communications through the closest lower tier Radiolet(s)™, reduces the latency of the content/media/application session and can allow more subscriber sessions to be hosted on the same network; completing a session in a shorter amount of time also allows for a given subscriber mobile device to stop sending various control messages (e.g., pilot beams and channel quality information, app layer keep alive messages, etc.), which can allow the network and datacenter to admit additional subscribers who may be able to make additional traffic data requests; and through a combination of resource management and flow control methods, additional and significant gains in operating efficiencies can be achieved which can allow for faster flow control protocol sessions. Furthermore, following the completion of a data content or application session, the present disclosure can allow for additional sessions from the same or different subscriber mobile devices using the same methods.

In one embodiment, the present disclosure can include the following features, applicable to a content eco-system subscriber base, for example (without limitation): the lower Radiolet(s)™ directly provide storage and caching for static content/pages; and dynamic mobile content acceleration may be provided through a hybrid caching/storage and mobile microservices solution. The functionality for dynamic site acceleration may be split between both the upper and lower tier Radiolet(s)™. Moreover, app data may be stored locally in transient databases, with corresponding microservices logic for retrieval, delivery, synch-up, etc. Both the upper tier Radiolet(s)™ and lower tier Radiolet(s)™ may be configured to support any type of software application, and software application roll out (e.g., its introduction to the general public), may depend on business strategy and product management input from content eco-system subscribers. To further expedite the roll-out of new app features, and products, the upper tier Radiolets™ may come pre-equipped with hundreds of microservices for any app provider to make use of. Locations of subscribers may be discovered when a subscriber makes an app request. In an exemplary embodiment, every request for app data passes through a lower tier Radiolet™ of a Mobility-Cloud Interconnect System. As the user migrates from one location to another, various state machines can be easily updated to determine which lower tier Radiolet™ the user is attached to. This information can then be stored so that optimal paths for data communication between subscribers can be determined. In the case of mobile subscribers, data communication continuity may be provided when mobile devices move from one location (e.g., one radio edge) to another.

The present disclosure can provide various "value added services" packaged around application programming interface (API) information (in the form of metadata) that will abet monetization. The present disclosure can provide the value added services to subscribers, but obtain them from operators as well as other third party vendors, while providing necessary information to generate these monetization API's, essentially acting as a "super market shelf" for the value added services. These value-added-services, from the content and app eco-systems perspective, allows the acceleration of roll out of new services and leveraging of market opportunities earlier than currently possible.

In an exemplary embodiment of the present disclosure, intelligent algorithms can be provided to improve the efficiency of the RAN by increasing the number of pages/sessions that are delivered or completed in a unit of time over a given unit of spectrum. This can be achieved through a set of optimizations to flow control algorithms that are typically part of TCP, and treating flow control as an outer loop control mechanism adapted to work with existing mac layer scheduling algorithms. In one embodiment, the present disclosure does not require any modifications to the mac layer scheduling algorithms. A coordinated exchange between source and target serving nodes of content information as well as TCP parameters, referred to as "content layer mobility," can be provided for session continuity. This addresses the issue of a subscriber migrating from one content serving node to another node during a content/app session. In one embodiment, the present disclosure can operate above the RAN which can provide for an architecture and deployment agnostic solution, which means that the present disclosure is not constrained by the type of data network deployment of mobile operators (e.g., macro, micro, pico and femto cellular deployments).

Turning now to an exemplary social media exchange (e.g., a messaging application or a real-time audio exchange between two parties) according to an exemplary embodiment of the present disclosure, the social media exchange comprises of an exemplary mobile to mobile data flow according to an exemplary embodiment of the present disclosure. In this flow, a caller device and callee device (e.g., two mobile phones or other communication devices capable of voice over IP (VoIP) communications) may be connected to the same RAN. For example, the two devices may use the same provider network and may even be located within the same cell. Call setup signaling, through various app servers, may take place between caller device, RAN, core network, peering point, and app signaling server. Similarly, signaling may also take place between callee device, RAN, core network, peering point, and app signaling server. In one embodiment, an improved (or optimal) data communication of traffic packets (or media packets as applicable in the application layer) between caller device and callee device may follow the path of caller device to RAN, RAN to lower tier Radiolet™, lower tier Radiolet™ to upper tier Radiolet™, upper tier Radiolet™ to target upper tier Radiolet™ where the callee device is anchored, target upper tier Radiolet™ to the callee device, or vice versa, without proceeding through the conventional paths across the three miles described earlier (e.g., the first mile, the middle mile, and the last mile). In order for such optimized routing to work, the location of the target upper tier Radiolet™ where the callee device is anchored is retrieved from a database that is locally available at every upper tier Radiolet™. The information populated in such a database can be from the location discovery mechanism described earlier.

Turning now to an exemplary mobile to mobile data flow according to an exemplary embodiment of the present disclosure, locations of caller device and callee device can be known by the system. However, these devices may cross radio edges prior to or in the course of a data exchange. Thus, caller device and callee device may start out in the same cell, but may drift into different cells during a session. In another embodiment, caller device and callee device may start a session geographically separated and/or remain geographically separated for an entire session. In yet another embodiment, caller device and callee device may be in separate provider networks (and may or may not be geographically close to one another). The flow described above may be used to facilitate communications between caller device and callee device in all these situations, for example.

In such near real-time (or real-time) mobile-to-mobile social media transactions, the device types and capabilities may differ. For instance, in an audio exchange, the coding formats supported by the end points may be different. In an exemplary embodiment of the present disclosure, support for alteration and normalization of formats in both directions (e.g., transcoding), to support an exchange that is transparent to the user/device, can be performed by one or more micro-services at the one or more upper tier Radiolets™ Alternatively, in an exemplary embodiment of the present disclosure, the one or more upper tier Radiolets™ involved in such mobile-to-mobile social media transactions and exchanges may determine in advance a format that is common to device end-points and hence use a transcoder free operation for the exchange.

In one embodiment of the present disclosure, optimization of search functions typically embedded in any app are supported. This applies to static, dynamic, near real-time, and real-time applications. A typical use-case comprises, for example, client app embedded with a search dialog function and the server side of the app performing such search functions on a distributed collection of application databases and returning such search results with a hyperlink to access results of said search. In an exemplary embodiment, various application layer databases (or subset of the databases) can be implemented across one or more upper tier Radiolets™. In addition to implementing databases at said upper tier Radiolets™, microservices containing search data-logic shall be implemented in these (or larger collection) of upper tier Radiolets™. Once a request for a search is received by the upper tier Radiolet™ closest to the client, one or more microservices may be invoked and executed in an operating system container at said upper tier Radiolet™. The software and logic for such execution, shall reside at the said upper tier Radiolet™. Following this preliminary execution of one or more micro-services, a discovery of which application databases contain application data and corresponding hyperlinks that "pertain" to the search request can be completed. The results of the search are then curated, based on various application policies, logic, and real-time inputs, and a response to the client is assembled. The said upper tier Radiolet™ simultaneously can send the response to the client, and can request app data from various application databases (distributed across multiple upper tier Radiolets™ and other application back-end infrastructure owned by the application provider) over a high-speed link. App data received from such application databases will potentially be available at the upper tier Radiolet™ before the end-user requests any specific piece of app data that is embedded in the search response.

Once the client app receives the search response, the end-user requests are then served directly from the upper tier Radiolet™. Upon completion of the search request, the upper tier Radiolet™ may choose to apply internal logic, to continue and store various pieces of app data received, and/or to service future requests from the same or different clients. Such internal logic, can be further optimized by setting a "time-to-live" parameter which when expired allows the upper tier Radiolet™ to delete such app data records.

In one embodiment of the present disclosure, mobility API's can be used for various business uses and benefits. Table 1 below provides an exemplary list of mobility API's according to the present disclosure and an exemplary business use case and business benefit for each exemplary API. While Table 1 below may use the language of 3G-HSPA networks, it should be understood that the exemplary mobility API's are applicable to any access network type, including for example (without limitation): HRPD, LTE, WiFi, etc.

TABLE 1

| API Name | Type | Business Use case | Business Benefit |
| --- | --- | --- | --- |
| Network Load | Optimization API | Based on the network load at a particular RNC (e.g., an HSPA network) and existing user profile such as user agent and user information from the present disclosure such as pre-paid or post-paid, the user can be shown the most optimal content For e.g. a) Network Load is light and the user is post-paid with an apple device-rich media images/Higher definition videos of | 1. User engagement improves due to richer content being displayed, potential increase in transaction conversion for the right users |

TABLE 1-continued

| API Name | Type | Business Use case | Business Benefit |
|---|---|---|---|
| | | hotels/properties can be shown b) Network load is heavy/user is pre-paid, user agent is lower end smartphone show the lowest definition images<br>There can be many such permutation and combinations that can be defined in the rules engine to enable the most optimal response | 2. User experience improves even in poor network conditions<br>3. Consistent app performance |
| Network Load & Anchor Users | Optimization & Information API | Based on the network load and the anchor users who are latched on to the RNC, location contextual offers can be sent in rich media format. E.g.:<br>1. if the network load is minimal, rich media offers based on videos can be notified to users<br>2. Network load is medium and if there is an urgency for notification, notifications can be banner based<br>3. If network load is heavy, decide not send notifications at that moment | User engagement improves due to rich media notifications being displayed, leading to potential acceptance of offers, and higher conversion rate of notifications |
| Location | Information API | Consistent/unambiguous location information of users irrespective of app or browser can be used to give location contextual offers, e.g.:<br>1. M&E can curate the search results to give weightage to regional/local news, display local language information<br>2. OTA's on the basis of search, populate local offers, notify what's going on locally, events, travel information etc.<br>3. Rich media notifications can be sent that which are locally relevant to high end smartphone users combined with a knowledge of post-paid information | User engagement improves due to relevant offers/content is being offered, this could offer potentially increased consumption of content or transaction conversion for the offers made |
| Roaming | Information API | Roaming information combined with current location and base location can help understand user's profile. E.g.:<br>1. As soon as a user arrives at a particular location, the user can be notified for a potential hotel property offer<br>2. Content/advertising can be curated both for local location as well as base location<br>3. Allied offers such as land transport can be offered as incentives to do ticketing or property booking<br>4. User traffic pattern can be studied for predicting user behavior e.g if user is typically visiting the same city 3-4 times a month, a longer term stay offer can be made specifically to that user tying with some hotel property | Help improve user engagement by giving targeted offers, contextual content, leading to increased transaction conversion, adp erformance if any..<br>Helps understand users better for future engagement and offers |
| Pre-Paid/ Post Paid | Information API | Based on this information and combined with location, roaming, network load many decisions can be taken with respect to offers, notifications, content richness etc. E.g.:<br>1. Post-paid combined with high-end smartphone user agent and location, can target highly relevant rich media offers.<br>2. For high end smartphones like Apple, Hotel search results can be curated to display high-end properties with rich media/videos, if the smart phone is low end, 2 star/3 star properties can be put at the top.<br>3. Alternatively hotel offers that are classified due to special discounts or margins to OTA's can be displayed with rich media content. | Helps improve user engagement by giving targeted offers, contextual content, leading to increased transaction conversion, ad performance. This could offer potentially increased consumption of content or transaction conversion for the offers made |

In one embodiment of the present disclosure, an "outer loop algorithm" can be implemented at the lower tier Radiolet(s)™. The outer loop algorithm is a cross layer resource management algorithm that improves the operating efficiency of the spectrum. The outer loop algorithm can apply information obtained in one layer to another layer. In an exemplary embodiment of the present disclosure, the outer loop algorithm can allow individual point to point protocol (PPP) sessions (not just transmission control protocol (TCP) sessions) to be optimized. When individual PPP sessions are optimized, the system can deliver more pages per PPP session.

In a further exemplary embodiment, any of the features and/or method steps described herein may be embodied in and/or implemented by any of the systems, devices, processors or apparatus described herein. Moreover, any of the method steps described herein may be implemented in an operator network and/or an Internet cloud datacenter using existing equipment and apparatus by implementing one or more software applications having computer readable instructions that when executed cause said existing equipment and apparatus to perform (or exhibit) one or more of the method steps and/or features described in this disclosure.

A system according to the present disclosure may comprise one or more computer devices comprising one or more processors configured to execute computer readable instructions that, when executed, cause said one or more computer devices to perform any of the method steps (and/or exhibit any of the features) described herein. The computing devices may include any combination of (and any number of) hierarchical system of Radiolets™, datacenters, computers, data sources, data request sources, servers, mobile communication devices, smart phones, tablets, any other mobile telecommunication and/or mobile data network elements, and/or any other computing and/or communication devices.

Notably, the systems and methods described herein are not limited to typical mobile communications. Instead, the systems and methods described herein may be in connection with mobile entertainment enablement solutions, mobile infotainment enablement solutions, mobile ad-tech enablement solutions, mobile social media enablement solutions, mobile commerce enablement solutions, mobile enterprise application enablement solutions, mobile peer-to-peer enablement solutions, mobile communications enablement solutions mobile enterprise application enablement solutions, and other mobile solutions such as toll-free data enablement solutions.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A method for mobile cloud computing for a mobility network, the method comprising:
    deploying at least one first radiolet server comprising at least one mobility networking module locally at a radio edge;
    deploying at least one second radiolet server comprising at least one mobility application module, the at least one second radiolet server in communication with an application cloud and the at least one first radiolet server;
    separating packets destined to a packet core at a node close to the Radio Access Network (RAN) into control plane packets and user plane packets;
    routing the control plane packets to a mobile core network configured to perform one or more management plane and control plane functions on the control plane packets;
    routing traffic packets among the user plane packets to the at least one first radiolet server, the at least one mobility networking module configured to perform one or more traffic data plane functions for at least one of managing and routing the traffic packets; and
    routing application packets among the user plane packets to the at least one second radiolet server, the at least one mobility application module configured to perform one or more application data plane functions on the application packets for at least one of managing one or more applications and corresponding application data,
    wherein:
    the at least one mobility application module and the at least one mobility networking module are executed by at least one processor and stored in at least one non-transitory memory, and
    the at least one first radiolet server and the at least one second radiolet server move user plane functions closer to the radio edge without necessitating an upgrade to the mobile core network.

2. The method of claim 1, wherein the at least one first radiolet server moves traffic plane functions to the radio edge.

3. The method of claim 1, wherein the at least one first radiolet server and the at least one second radiolet server create virtual and mobile application instances that migrate with a mobile device.

4. The method of claim 1, wherein the at least one first radiolet server is in communication with the at least one second radiolet via at least one of a router and at least one of a switch.

5. The method of claim 1, wherein the at least one second radiolet server is located at or proximal to at least one hosting datacenter.

6. The method of claim 1, wherein the at least one second radiolet server is located external to a packet core of the mobile core network.

7. The method of claim 1, wherein the routing of the traffic packets further comprising routing the traffic packets to one among the at least one first radiolet server that is closest to a computing device associated with the traffic packets.

8. The method of claim 1, wherein the at least one first radiolet server is further configured to perform one or more functions comprising encapsulating and tunneling of the traffic data packets, traffic data packet delivery, network policy enforcement, monitoring of signaling data messages, operating as a serving point for at least one Internet protocol (IP) session, processing dynamic content, caching and storing at least one of content and application data, providing content layer mobility during one or more network mobility events, and providing network and application layer quality of service (QoS).

9. The method of claim 1, wherein the one or more application data plane functions include at least one of application hosting, application data processing and application data distribution.

10. The method of claim 1, the method further comprising:
    performing, in the at least one first radiolet server and at least one second radiolet server, execution functions of a cloud session with an application cloud.

11. The method of claim 10, wherein the one or more computing execution functions comprise one or more of implementation of cloud containerization and implementation of a virtualized cloud session.

12. The method of claim 10, further comprising:
    implementing at least one interconnect module in the at least one first radiolet server and the at least one second radiolet server and causing the at least one interconnect module configured to perform communication functions;
    implementing at least one solution module in the at least one first radiolet server and the at least one second radiolet server and causing the at least one solution module configured to perform application support and data storage functions; and
    implementing at least one mobility interface module in the at least one first radiolet server and the at least one second radiolet server and causing the at least one mobility interface module to perform interfacing functions,
    wherein the at least one interconnect module, the at least one solution module and the at least one mobility interface module are executed by the at least one processor and stored in the at least one non-transitory memory.

13. The method of claim 10, wherein the method provides for one or more of hyper-distribution of access and functions that migrate with a client device, optimization and interaction across layers of the mobility network and the application cloud and solutions that abet provisioning of digital services.

14. The method of claim 1, the method further comprising:
    establishing a flow control protocol session between the at least one first radiolet server and a mobile device, and
    transmitting one or more among the traffic packets to the mobile device as a flow control protocol datagram.

15. The method of claim 1, wherein the at least one first radiolet server and the at least one second radiolet server are distributed geographically.

16. The method of claim 1, the method further comprising:
    retaining, by the at least one mobility networking module, the one or more management plane and control plane functions in the mobile core network.

17. The method of claim 16, the method further comprising:
implementing at least one of the one or more management plane and control plane functions in an operator proxy radiolet server.

18. The method of claim 1, wherein one or more of the at least one first radiolet server and the at least one second radiolet server is configured to create multiple data planes associated with different application data.

19. The method of claim 1, wherein one or more of the at least one first radiolet server and the at least one second radiolet server is configured to create multiple containers associated with different application data.

20. A method of providing mobility management in a mobile cloud computing environment, the method comprising:
deploying at least one first radiolet server comprising at least one mobility networking module of a mobility network positioned locally at a radio edge, the at least one mobility networking module performing one or more traffic data plane functions for managing and routing traffic data packets, the at least one first radiolet server in communication with a mobile core network;
deploying at least one second radiolet server comprising at least one mobility application module of the mobility network, the at least one mobility application module performing one or more application data plane functions for managing one or more applications and corresponding application data, the at least one second radiolet server in communication with an application cloud; and
deploying at least one mobility cloud module in the at least one first radiolet server and the at least one second radiolet server and causing the at least one mobility cloud module to perform one or more computing execution functions for implementing a cloud session,
wherein:
the at least one mobility networking module, the at least one mobility application module and the at least one mobility cloud module are executed by at least one processor and stored in at least one non-transitory memory, and
the method provides for one or more of hyper-distribution of access and functions that migrate with a client device optimization and interaction across layers of the network and the application cloud, and solutions that abet provisioning of digital services without necessitating an upgrade to the mobile core network.

21. The method of claim 20, further comprising:
implementing at least one interconnect module in the at least one first radiolet server and the at least one second radiolet server and causing the at least one interconnect module configured to perform communication functions;
implementing at least one solution module in the at least one first radiolet server and the at least one second radiolet server and causing the at least one solution module configured to perform application support and data storage functions; and
implementing at least one mobility interface module in the at least one first radiolet server and the at least one second radiolet server and causing the at least one mobility interface module to perform interfacing functions,
wherein the at least one interconnect module, the at least one solution module and the at least one mobility interface module are executed by the at least one processor and stored in the at least one non-transitory memory.

22. The method of claim 21, wherein at least a portion of the interconnect module is located at the radio edge.

23. The method of claim 20, wherein the at least one first radiolet server and the at least one second radiolet server create virtual and mobile application instances that migrate with a mobile device.

24. The method of claim 20, wherein the at least one first radiolet server is further configured to perform one or more functions comprising encapsulating and tunneling of the traffic data packets, traffic data packet delivery, network policy enforcement, monitoring of signaling data messages, operating as a serving point for at least one Internet protocol (IP) session, processing dynamic content, caching and storing at least one of content and application data, provide content layer mobility during one or more network mobility events, and providing network and application layer quality of service (QoS).

25. The method of claim 20, wherein the one or more application data plane functions include at least one of application hosting, application data processing and application data distribution.

26. The method of claim 20, wherein the at least one second radiolet server is configured to perform one or more functions comprising supporting a mobile web services engine coupled with dynamic on demand virtualization to one or more sessions across one or more content properties, dynamically distributing content to the at least one first radiolet server and serving one or more operator networks.

27. The method of claim 20, wherein the at least one first radiolet server moves the one or more traffic data plane functions to the radio edge.

28. The method of claim 20, wherein the one or more computing execution functions comprise one or more of implementation of cloud containerization and implementation of a virtualized cloud session.

29. The method of claim 20, the method further comprising routing at least a portion of the traffic packets to one among the at least one first radiolet server that is closest to a mobile device associated with the traffic packets.

* * * * *